United States Patent
Sato et al.

(10) Patent No.: US 9,777,713 B2
(45) Date of Patent: Oct. 3, 2017

(54) FLOATING OFFSHORE WIND POWER GENERATION FACILITY

(71) Applicants: TODA CORPORATION, Chuo-ku, Tokyo (JP); KYOTO UNIVERSITY, Kyoto-shi, Kyoto (JP); HITACHI, Ltd., Chiyoda-ku, Tokyo (JP)

(72) Inventors: Iku Sato, Tokyo (JP); Hitoshi Asano, Tokyo (JP); Tomoaki Utsunomiya, Kyoto (JP); Shigeo Yoshida, Hitachi (JP)

(73) Assignees: Toda Corporation, Tokyo (JP); Kyoto University, Kyoto (JP); Hitashi, Ltd., Tokyo (JP)

( * ) Notice: Subject to any disclaimer, the term of this patent is extended or adjusted under 35 U.S.C. 154(b) by 0 days.

(21) Appl. No.: 14/774,939

(22) PCT Filed: Mar. 3, 2014

(86) PCT No.: PCT/JP2014/055228
§ 371 (c)(1),
(2) Date: Sep. 11, 2015

(87) PCT Pub. No.: WO2014/141911
PCT Pub. Date: Sep. 18, 2014

(65) Prior Publication Data
US 2016/0025074 A1    Jan. 28, 2016

(30) Foreign Application Priority Data
Mar. 13, 2013   (JP) .................................. 2013-050180

(51) Int. Cl.
*F03D 11/04*   (2006.01)
*E02D 27/10*   (2006.01)
(Continued)

(52) U.S. Cl.
CPC ............ *F03D 11/045* (2013.01); *B63B 1/048* (2013.01); *B63B 5/18* (2013.01); *B63B 5/22* (2013.01);
(Continued)

(58) Field of Classification Search
CPC ............................................... E02B 2017/0091
(Continued)

(56) References Cited

U.S. PATENT DOCUMENTS 2,690,769 A * 10/1954 Brown ................. B29D 23/001
                                                      138/125
2,810,424 A * 10/1957 Swartswelter ...... B29C 47/0023
                                                      138/126
(Continued)

FOREIGN PATENT DOCUMENTS

| JP | 2001-165032 | 6/2001 |
| JP | 2005-240785 | 9/2005 |

(Continued)

*Primary Examiner* — Benjamin Fiorello
*Assistant Examiner* — Edwin Toledo-Duran
(74) *Attorney, Agent, or Firm* — Norris McLaughlin & Marcus, P.A.

(57) ABSTRACT

A floating offshore wind power generation facility includes a floating body, a mooring cable, a tower, and a windmill installed at the top of the tower, the windmill including a nacelle and a plurality of blades. The rotation axis of the windmill has a predetermined upward angle to avoid contact between the blades and the tower, and the windmill is of a downwind type in which the blades are attached to the leeward side of the nacelle and installed with the back surfaces of the blades facing windward, and the mooring point of the mooring cable to the floating body is set at a position below the surface of the sea and higher than the center of gravity of the floating body.

7 Claims, 21 Drawing Sheets

(51) Int. Cl.

| | |
|---|---|
| *E02D 27/42* | (2006.01) |
| *E02D 27/50* | (2006.01) |
| *E02D 27/52* | (2006.01) |
| *F03D 1/06* | (2006.01) |
| *B63B 35/44* | (2006.01) |
| *F03D 13/20* | (2016.01) |
| *F03D 13/25* | (2016.01) |
| *B63B 5/18* | (2006.01) |
| *B63B 5/22* | (2006.01) |
| *B63B 21/50* | (2006.01) |
| *B63B 39/00* | (2006.01) |
| *B63B 39/06* | (2006.01) |
| *B63B 1/04* | (2006.01) |
| *F03D 9/25* | (2016.01) |
| *F03D 13/10* | (2016.01) |

(52) U.S. Cl.
CPC ............. *B63B 21/50* (2013.01); *B63B 35/44* (2013.01); *B63B 39/005* (2013.01); *B63B 39/06* (2013.01); *E02D 27/10* (2013.01); *E02D 27/425* (2013.01); *E02D 27/50* (2013.01); *E02D 27/52* (2013.01); *F03D 1/06* (2013.01); *F03D 9/25* (2016.05); *F03D 13/10* (2016.05); *F03D 13/22* (2016.05); *F03D 13/25* (2016.05); *B63B 2001/044* (2013.01); *B63B 2021/505* (2013.01); *B63B 2035/442* (2013.01); *B63B 2035/446* (2013.01); *B63B 2039/067* (2013.01); *F05B 2240/93* (2013.01); *F05B 2240/95* (2013.01); *Y02E 10/721* (2013.01); *Y02E 10/726* (2013.01); *Y02E 10/727* (2013.01)

(58) Field of Classification Search
USPC ........ 405/5, 222, 223, 223.1, 224, 203, 204, 405/205, 206, 207, 208, 209
See application file for complete search history.

(56) References Cited

U.S. PATENT DOCUMENTS

| | | | | |
|---|---|---|---|---|
| 3,490,983 A * | 1/1970 | Lee | ...................... | B29C 53/582 138/144 |
| 4,248,062 A * | 2/1981 | McLain | ................ | B29C 70/085 138/130 |
| 4,336,415 A * | 6/1982 | Walling | ................. | F16L 11/22 138/111 |
| 4,728,224 A * | 3/1988 | Salama | ................ | B63B 21/502 166/367 |
| 5,048,441 A * | 9/1991 | Quigley | ............. | B29C 53/8008 114/90 |
| 5,188,872 A * | 2/1993 | Quigley | ............. | B29C 53/8058 114/102.31 |
| 5,555,838 A * | 9/1996 | Bergman | ................ | B63B 35/44 114/265 |
| 5,803,668 A * | 9/1998 | Seki | ...................... | E02B 17/021 405/195.1 |
| 5,875,728 A * | 3/1999 | Ayers | .................. | B63B 35/4413 114/264 |
| 5,908,049 A * | 6/1999 | Williams | .............. | E21B 17/206 138/125 |
| 6,016,845 A * | 1/2000 | Quigley | ................... | D04C 1/06 138/125 |
| 6,220,303 B1 * | 4/2001 | Secher | .................. | E21B 17/017 138/109 |
| 6,305,427 B1 * | 10/2001 | Priest, II | ................. | F16L 11/12 138/104 |
| 6,402,431 B1 * | 6/2002 | Nish | ..................... | E21B 17/012 405/224.3 |
| 6,470,645 B1 * | 10/2002 | Maliszewski | ......... | E04H 12/085 52/40 |
| 6,575,665 B2 * | 6/2003 | Richter | ..................... | B63B 3/04 114/125 |
| 6,648,074 B2 * | 11/2003 | Finn | ........................ | B63B 21/50 166/350 |
| 6,772,840 B2 * | 8/2004 | Headworth | ............. | E21B 17/18 166/302 |
| 6,805,201 B2 * | 10/2004 | Nish | ...................... | E21B 17/012 166/350 |
| 6,817,309 B2 * | 11/2004 | Horton | ................... | B63B 9/065 114/264 |
| 6,851,231 B2 * | 2/2005 | Tadros | ...................... | E04C 3/22 52/223.14 |
| 7,096,940 B2 * | 8/2006 | Baxter | ................ | E21B 17/1085 166/241.6 |
| 7,156,586 B2 * | 1/2007 | Nim | ........................ | B63B 35/44 405/195.1 |
| 7,160,085 B2 * | 1/2007 | de Roest | ................ | E04H 12/085 416/244 R |
| 7,377,225 B2 * | 5/2008 | Finn | ........................ | B63B 21/50 114/264 |
| 7,393,158 B2 * | 7/2008 | Caldwell | ............... | E21B 17/017 166/241.6 |
| 7,770,343 B2 * | 8/2010 | Montaner Fraguet | .. | E04H 12/12 416/DIG. 6 |
| 8,066,033 B2 * | 11/2011 | Quigley | ..................... | D04C 1/06 138/114 |
| 8,197,208 B2 * | 6/2012 | Sharples | ............... | F03D 1/0608 415/7 |
| 8,281,547 B2 * | 10/2012 | Hettick | ................... | B29C 70/30 52/745.17 |
| 2001/0002757 A1 * | 6/2001 | Honda | ..................... | F03D 1/02 290/55 |
| 2003/0000448 A1 * | 1/2003 | Kruger | ..................... | H01Q 1/34 114/340 |
| 2003/0140838 A1 * | 7/2003 | Horton, III | ............ | B63B 9/065 114/264 |
| 2008/0240864 A1 * | 10/2008 | Belinsky | ................. | E02D 27/42 405/223.1 |
| 2009/0072544 A1 * | 3/2009 | Pao | ......................... | B63B 21/50 290/55 |
| 2009/0120345 A1 * | 5/2009 | Sveen | ..................... | B63B 21/50 114/264 |
| 2009/0196756 A1 * | 8/2009 | Althoff | ................... | F03D 1/0675 416/226 |
| 2009/0211173 A1 * | 8/2009 | Willey | .................. | B29C 70/222 52/40 |
| 2009/0266004 A1 * | 10/2009 | Willey | .................. | B29C 70/086 52/40 |
| 2009/0309271 A1 * | 12/2009 | Miller | ................... | B29C 70/443 264/563 |
| 2009/0317585 A1 * | 12/2009 | Bech | ........................ | B29B 11/16 428/113 |
| 2011/0037264 A1 * | 2/2011 | Roddier | ................. | B63B 35/44 290/44 |
| 2011/0061321 A1 * | 3/2011 | Phuly | ...................... | E02D 27/42 52/297 |
| 2011/0061332 A1 * | 3/2011 | Hettick | ................... | B29C 70/30 52/651.07 |
| 2011/0062639 A1 * | 3/2011 | Miller | .................... | B29C 70/44 264/571 |
| 2011/0138704 A1 * | 6/2011 | Bagepalli | ................ | E04H 12/12 52/147 |
| 2011/0138721 A1 * | 6/2011 | Bagepalli | ................ | E02D 27/42 52/299 |
| 2011/0162748 A1 * | 7/2011 | Morand | .................. | E21B 17/01 138/109 |
| 2011/0169190 A1 * | 7/2011 | Miller | ................... | B29C 70/443 264/257 |
| 2011/0173978 A1 * | 7/2011 | Rekret | ..................... | F03G 7/05 60/641.7 |

FOREIGN PATENT DOCUMENTS

| | | |
|---|---|---|
| JP | 2007-160965 | 6/2007 |
| JP | 2007-331414 | 12/2007 |
| JP | 2008-542630 | 11/2008 |

(56) References Cited

FOREIGN PATENT DOCUMENTS

| | | | |
|---|---|---|---|
| JP | 2009-018671 | | 1/2009 |
| JP | 2009-235850 | | 10/2009 |
| JP | 2010-223113 | | 10/2010 |
| JP | 2010-223114 | | 10/2010 |
| JP | WO2010110330 | * | 10/2010 |
| JP | WO2011138824 | * | 11/2011 |
| JP | 2012-012974 | | 1/2012 |
| JP | 2012012974 | * | 1/2012 |
| JP | 2012-149531 | | 8/2012 |
| JP | 2012149531 | * | 8/2012 |
| WO | WO-03/004869 | | 1/2003 |
| WO | WO-2011/138824 | | 11/2011 |

* cited by examiner

CHANGE IN GENERATED POWER OUTPUT
AS FUNCTION OF TILT ANGLE

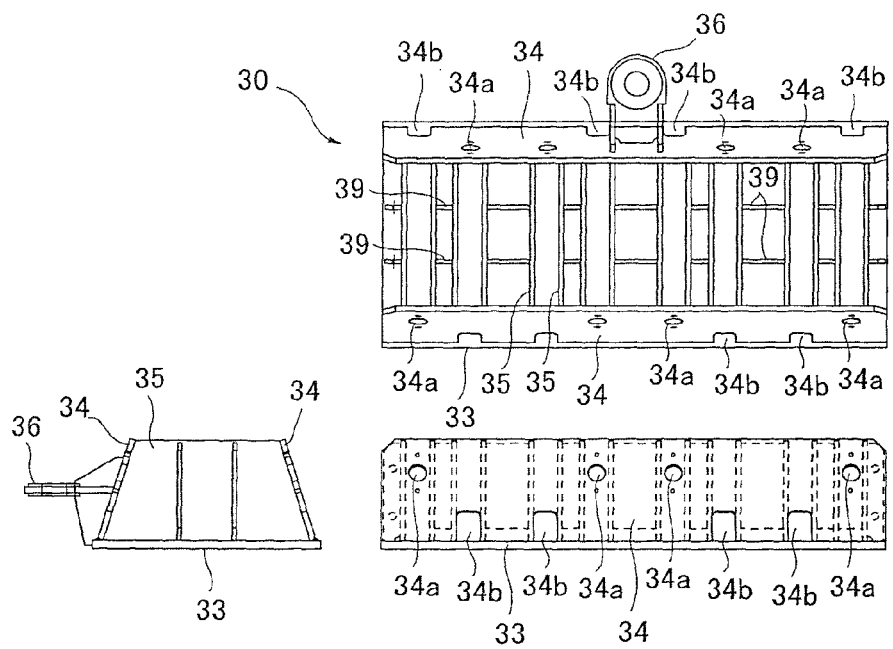
Fig. 12(A)
Fig. 12(C)  Fig. 12(B)
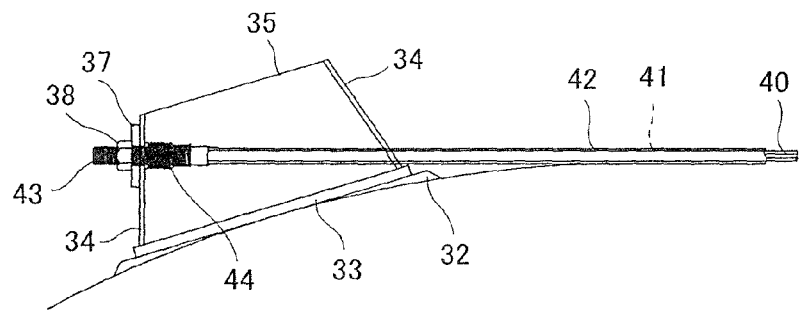
Fig. 13

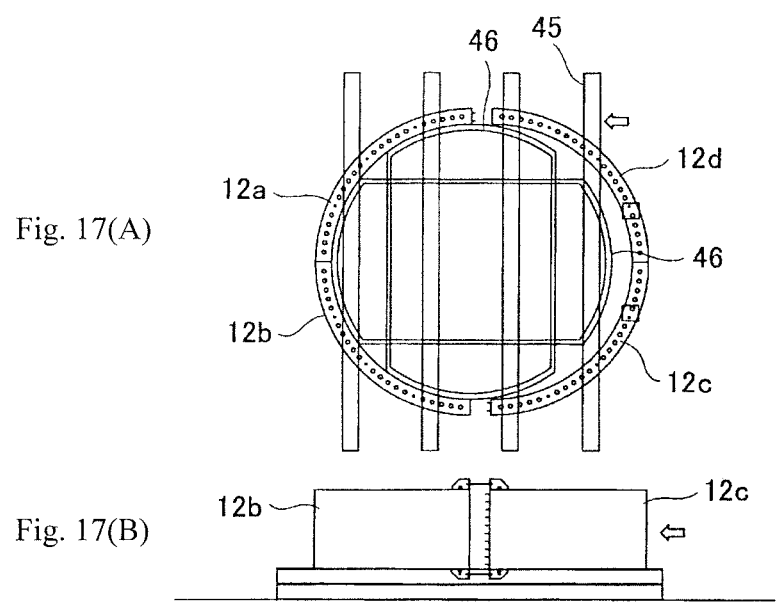
Fig. 17(A)
Fig. 17(B)
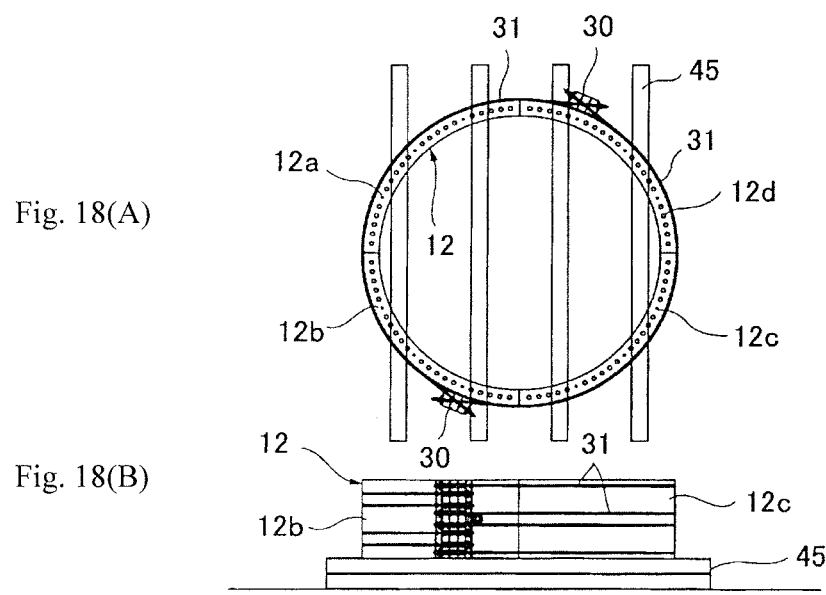
Fig. 18(A)
Fig. 18(B)

FLOATING OFFSHORE WIND POWER GENERATION FACILITY

BACKGROUND OF THE INVENTION

The present invention relates to a spar-type floating offshore wind power generation facility that is installed on a relatively deep-water sea.

Power generation methods such as hydroelectric power generation, thermal electric power generation, and nuclear electric power generation have hitherto been almost exclusively adopted. In recent years, however, wind power generation that generates electric power through the utilization of natural wind has drawn attention from the viewpoints of environment and effective utilization of natural energy. Wind power generation facilities are classified into land installation types and water installation (mainly sea installation) types. It should be noted that, in Japan that contains mountainous regions from coastal areas towards backhand, the tracts of flat lands where stable wind is expected are small in coastal areas. On the other hand, Japan is surrounded by sea on all four sides and thus is advantageous in that wind suitable for power generation can easily be obtained on the sea and, at the same time, there is little or no restriction on installation. Accordingly, many floating offshore wind power generation facilities have recently been proposed.

For example, JP2001-165032A proposes a wind power generation apparatus including: a trigonal planar floating body that includes a combination of hollow quadrilateral prismatic structures and floats on water; and a windmill for power generation, provided on the floating body. The floating body is called a "pontoon type" because the floating body floats on the water.

JP2007-160965A proposes a floating body structure including: a plurality of floating bodies with, articles being mounted on the upper part thereof; connections that are formed of a longitudinal rigid body that has a predetermined center with an inner end of the rigid body connected thereto, is extended from the inner end in a horizontal radial direction and has an outer end with the floating body connected thereto; and a tensioning portion that produces a tensile force between the floating bodies.

JP2007-331414A proposes a floating body structure including: a plurality of floating bodies that float on water; connections that are formed of a rigid body and annularly connect the floating bodies to each other; a mooring unit that moors an annular substantially central portion at a water bottom; a position detecting means that detects the position of the floating body; a tidal current detecting means that detects a tidal current; helms that are mounted on the plurality of floating bodies in such a manner that the angle to the tidal current is variable; and a position control unit that allows the position of the floating bodies to be varied by regulating the angle of the helms to the tidal current with the annular substantially central portion presumed to be central. The floating body structures in JP2007-160965A and JP2007-331414A described above are called a "semi-submerged type" because the floating body structure floats with the floating bodies being submerged below water.

Further, JP2009-18671A proposes a floating body structure for offshore wind power generation, the floating body structure including: a lower floating body including upper and lower lids and cylindrical precast concrete blocks continuously installed between the upper and lower lids, the upper and lower lids being integrally joined to the concrete blocks with a PC steel material; and an upper floating body integrally joined to the lower floating body with a PC steel material, the upper floating body including precast concrete blocks having a smaller diameter than, the precast concrete blocks in the lower floating body, and upper lids, wherein a plurality of ballast tanks are formed on the lower inner side of the lower floating body by partition walls and a plurality of water-tight compartments are formed on the inner side of the upper floating body by partition walls. The floating body structure of JP2009-18671A floats in a standing state like bobbers for fishing and is thus called, a "spar type."

Only one spar-type floating body of the above type can be mounted on one floating body. The spar-type floating body, however, is superior in cost effectiveness to other types of floating bodies, that is, a pontoon-type and semi-submerged floating bodies and, at the same time, is excellent in stability of the floating body.

Accordingly, the present applicant also has proposed, in JP2010-223113A, a spar-type offshore wind power generation facility 50 as shown in FIG. 25, the spar-type offshore wind power generation facility 50 including: a floating body 51; a deck 52 that is installed on the upper part of the floating body 51; a mooring cable 53 connected to the deck 52; a tower 54 provided upright on the deck 52; and nacelles 55 and a plurality of windmill blades 56,56 . . . provided at the top of the tower 54, wherein the floating body 51 includes a lower concrete floating body structure 51A and an upper steel floating body structure 51B, the lower concrete floating body structure 51A including a plurality of concrete precast cylindrical bodies that have been stacked on top of each other in the direction of height and joined integrally to each other with a PC steel material, the upper steel floating body structure 51B being consecutively provided, on the upper side of the lower concrete floating body structure 51A, the floating body 51 having a spar-type floating body structure having a closed-end hollow portion with the upper end being open, and the tower being allowed to be lifted/lowered at least in construction, by a tower lifting/lowering equipment provided on the deck 52 and can be housed in the floating body 51.

SUMMARY OF THE INVENTION

Windmill types are classified into upwind types where blades are mounted on a windward side of nacelles and are provided to face windward, to receive wind from the front side, and downwind types where blades are mounted on a leeward side of nacelles with the back side of the blades facing upwind to receive wind from the back side. In general, when an obstacle exists on the upwind side of the blades, the efficiency is said to be lowered. Thus, upwind types are mainly adopted. In this case, in order to prevent the blade from coming into contact with the tower by flexing of the blade, the rotation axis of the windmill has a predetermined upward angle $\theta$ (=about 5 to 10°) to a horizontal line, as shown in FIG. 26(A).

When the wind, power generation, facility is of the floating body type, the lower end of the tower is not fixed to the ground. Therefore, since the tower is tilted by wind pressure toward a leeward side, as shown in FIG. 26(B), a rotation plane S of the blade is further tilted upward ($\theta+\beta$), disadvantageously leading to a lowered wind receiving area that in turn results in a lowered power generation efficiency.

In the floating body-type offshore power generation facility, when wind blows against the windmill, the rotary force (yaw) occurs around a vertical axis in the floating body and consequently reduces wind-induced resistance, disadvantageously posing problems of a lowered power generation efficiency and significant tilting during a storm that results in an increased load acting on the mooring cable.

Further, in JP2010-223113A, a method is adopted in which mooring points are installed on the sea surface to render the working point of the mooring high and thus to increase the suppressing force of the floating body movement. This method, however, poses a problem that the provision of mooring points on the sea surface leads to danger, that is, an increased possibility of contact of approaching boats and ships with the mooring.

On the other hand, in the offshore wind power generation facility disclosed in JP2010-223113A, that is, in the offshore wind power generation facility 50 that includes a concrete floating body structure 51A including a plurality of concrete precast cylindrical bodies that have been, stacked on top of each other in the direction of height and integrally joined to each other, a large bending stress acts on the concrete floating body structure 51A, for example, in assembly and transportation of the concrete floating body structure 51A and erecting of the offshore wind power generation facility 50. Here, after installation, since the concrete floating body structure 51A has such a support structure in which both ends are substantially free ends, axial force mainly acts and, thus, no significant bending stress acts. In particular, in the structure including a precast cylindrical body formed of a plurality of circumferentially split precast cylindrical bodies that have been joined to each other, the resistance to bending is so low that there is a possibility that deformation or damage occurs in assembly, transportation and erecting. Accordingly, to cope with bending, for example in assembly, a frame for reinforcement should be separately provided for temporary use. This is disadvantageous in that large-scale work is necessary and, at the same time, the cost is increased.

Accordingly, a main object of the present invention is to provide a spar-type floating offshore wind power generation facility that suppresses a lowering in power generation efficiency caused by tilting of the tower, suppresses rotary movement (yaw movement) around a vertical axis, prevents contact of boats and snips with mooring cables, and, at the same time, keeps a proper tilted posture of the tower.

The second object of the present invention is to further suppress the rotary movement (yaw movement) around a vertical axis particularly in a storm.

The third, object of the present invention is to facilitate assembly or other work and, at the same time, to reduce cost.

In order to solve the above problems, in aspect one of the present invention there is provided, a floating offshore wind power generation facility including a floating body, a mooring cable, a tower, and a windmill installed, at the top of the tower, the windmill including a nacelle and a plurality of blades, wherein the rotation axis of the windmill has a predetermined upward angle, and the windmill is of a downwind, type in which the blades are attached to the leeward side of the nacelle and installed with the back surfaces of the blades facing windward, and the mooring point of the mooring cable to the floating body is set at a position below the surface of the sea and higher than the center of gravity of the floating body.

In the invention of aspect one, from the viewpoint of avoiding contact between the blade and the tower, a downwind type is adopted in which a predetermined upward angle is provided in the rotation axis of the windmill and the blade is mounted on a leeward side of the nacelle with the back side of the blade facing upwind. Accordingly, in a calm state, as shown in FIG. 7(A), the rotational plane of the blade is in a downward, state ($-\theta$) against the upwind. On the other hand, when the blade receives a wind, as shown in FIG. 7(B), the blade is tilted toward, a leeward side to increase a wind receiving area, making it possible to prevent a lowering in power generation efficiency. In conventional upwind types, a tilt angle ($\beta$) derived from wind is added to a tilt angle ($\theta$) of the blade rotational plane in the initial state. On the other hand, in the downwind type of the present invention, a tilt angle ($\beta$) derived from, wind is added to a tilt angle ($-\theta$) of the blade rotational plane in the initial state. An improvement in power generation efficiency corresponding to the tilt angle $\theta$ can be always expected, over the upwind type.

Further, in the upwind type, due to the structure in which the blade is supported from the back side, a yaw moment is likely to occur, whereas, in the downwind type according to the present invention, since the blade is mounted, on a leeward, side of the nacelle, the blade is pulled in the front side for supporting, contributing to an advantage that the yaw moment is less likely to act.

The mooring point of the mooring cable to the floating body is set at a position that is below the sea surface and above the center of gravity of the floating body. Thus, the contact of boats and ships with mooring cables can be prevented. Further, since the mooring point is located at a position above the gravity center of the floating body, the moment of resistance with the center of gravity of the floating body presumed to be central is produced at the mooring point so as to prevent excessive tilting of the floating body, and thus, the tilted posture of the tower can be properly kept.

In aspect two the invention, there is provided a floating offshore wind power generation facility according to aspect one, wherein the lower side of the floating body has a concrete floating body structure formed of a plurality of concrete precast cylindrical bodies stacked on top of each other in the direction of height and the upper side of the floating body has a steel floating body structure formed of a steel member.

In aspect two the invention, a concrete floating body structure formed of a plurality of concrete precast cylindrical bodies stacked on top of each other in the direction of height is adopted as the lower-side floating body, and a steel floating body structure formed of a steel member is adopted as the upper-side floating body. The adoption of this composite structure can realize a lowered, center of gravity and an increased moment of resistance by an increase in arm length. In subsequent descriptions of this aspect two of the invention, the stacked concrete precast cylindrical bodies comprising the concrete floating body structure are referred to as "split" precast cylindrical bodies joined by "splitting the precast cylindrical body in a circumferential direction." This is intended to be equivalent to stating, for example, that the concrete floating body structure is comprised of a plurality of individual concrete precast cylindrical bodies joined, to each other as a stack to form an integral concrete precast cylindrical body.

In aspect three of the invention described, there is provided a floating offshore wind power generation facility according to aspect one or two, wherein a plurality of yaw-suppressing fins protruded from a circumferential surface of the lower side of the floating body are provided in a circumferential direction while providing spacing between the yaw-suppressing fins.

In aspect three of the invention, a plurality of yaw-suppressing fins protruding from a circumferential surface of the lower side of the floating body are provided in a circumferential direction while providing spacing between the yaw-suppressing fins. The adoption of the downwind type can realize a reduction in the occurrence of a yaw moment as compared with the upwind type. The floating body type is disadvantageous in that only the tensile force of the mooring cable can be expected and, once the yaw moment occurs, the yaw cannot be controlled, without difficulties. To overcome this drawback, a method has been adopted in which, yaw-suppressing fins are provided on the lower side of the floating body, preferably at a position of a water-depth of 30 m or less, to provide rotational resistance of the floating body, thereby suppressing yaw movement.

In aspect four of the invention, there is provided a floating offshore wind, power generation facility according to any one of aspect one to three, which includes ballasts having a weight that has been regulated so that, when the wind acts at an average wind velocity, the rotational plane of the blades is a substantially vertical plane.

In aspect four of the invention, in connection with the construction described in aspect one where the mooring point of the mooring cable to the floating body is sat to a position below the sea surface and above the center of gravity of the flowing body, the tilting of the rotational plane of the blade can be kept so that the wind receiving area is increased by regulating the magnitude of moment of resistance produced by this construction, that is, by regulating the weight of ballasts so that, when the wind acts at an average wind velocity, the rotational plane of the blades is a substantially vertical plane.

In aspect five of the invention, there is provided a floating offshore wind power generation facility according to aspect two, wherein the concrete floating body structure is composed of a plurality of split precast cylindrical bodies joined to each other, the split precast cylindrical bodies having been formed by splitting the precast cylindrical body in a circumferential direction, and an outer cable with a tensioning force introduced thereinto is circumferentially wound around the outer circumference of the precast cylindrical body.

In aspect five of the invention, the concrete floating body structure is composed of a plurality of split precast cylindrical bodies joined to each other, the split precast cylindrical bodies having been, formed by splitting the precast cylindrical body in a circumferential direction, and an outer cable with a tensioning force introduced thereinto is circumferentially wound around the outer circumference of the precast cylindrical body. Even in the plurality of split precast cylindrical bodies, since an outer cable with prestress introduced thereinto is wound in a circumferential direction to fasten the precast cylindrical body, the strength against bending of the precast cylindrical body is increased. Accordingly, even when a bending stress acts on the concrete floating body structure, for example, in assembly work and transportation work, and erecting of the floating offshore wind power generation facility, deformation and damage of the concrete floating body structure can be prevented and, at the same time, the necessity of providing temporary frames and the like can be eliminated, contributing to a reduced cost.

In aspect six of the invention, there is provided a floating offshore wind power generation facility according to aspect five, wherein a plurality of the outer cables are provided in an axial direction of the precast cylindrical body while providing spacing between the outer cables.

In aspect six of the invention, since a plurality of the outer cables are provided in an axial direction of the precast cylindrical body while providing spacing between the outer cables, the concrete floating body structure can be evenly reinforced in the axial direction.

In aspect seven of the invention, there is provided a floating offshore wind power generation facility according to aspect five or six, which includes two anchorage devices for the outer cable that face each other in a diametrical direction of the precast cylindrical body, the anchorage device including a lifting fitting for lifting the precast cylindrical body.

In aspect seven of the invention described, two anchorage devices for the outer cable that face each other are provided in a diametrical direction of the precast cylindrical body, the anchorage device including a lifting fitting that lifts the precast cylindrical body, and, thus, the bending stress load of the precast cylindrical body can be further suppressed.

In aspect eight of the invention, there is provided a floating offshore wind power generation facility according to any one of aspects five to seven, wherein the outer cable is temporarily provided and is removable in installing the floating offshore wind power generation facility.

In aspect eight of the invention, after the installation of the floating offshore wind power generation facility, since no significant bending stress acts, a construction can be adopted in which the anchorage device and an unbonded, wire rod are temporarily provided and removable after the installation of the floating offshore wind power generation facility.

As described above in detail, in spar-type floating offshore wind power generation facilities, a lowering in power generation efficiency by tilting of the tower can be suppressed, the rotational movement (yaw movement) around the vertical axis can be suppressed, the contact of boats and ships with, the mooring cable can be prevented, and, at the same time, the tilted posture of the tower can be properly kept.

Further, the rotational movement (yaw movement) around the vertical axis can be further suppressed particularly in storm.

Furthermore, assembly or other work can be facilitated, and, at the same time, the cost can be reduced.

BRIEF DESCRIPTION OF THE DRAWINGS

FIGS. 3(A), 3(B), 3(C) are views of a precast cylindrical body 12 (13), wherein FIG. 3(A) is a longitudinal sectional view, FIG. 3(B) is a plan view (an arrow view taken on line B-B), and FIG. 3(C) is a bottom view (an arrow view taken on line C-C).

FIGS. 7(A), 7(B) are side views illustrating tilting of a tower 4 by wind, wherein FIG. 7(A) shows a calm state (upright) and FIG. 7(B) shows a wind receiving state (tilted).

FIGS. 10(A), 10(B) are side views of a lower concrete floating body structure 2A, wherein FIG. 10(A) is a cross-sectional view and FIG. 10(B) is a side view with the perspective in the left portion being different from the perspective in the right portion.

FIGS. 11(A), 11(B) are a principal part enlarged views wherein FIG. 11(A) is a front view and FIG. 11(B) is a plan view.

FIGS. 12(A), 12(B), 12(C) are views illustrating an anchorage device 30, wherein FIG. 12(A) is a plan view, FIG. 12(B) is a front view, and FIG. 12(C) is a side view.

FIG. 13 is a front view of an outer cable 31.

FIGS. 15(A), 15(B) are views illustrating a construction procedure (part 1), wherein FIG. 15(A) is a plan view and FIG. 15(B) is a front view.

FIGS. 16(A), 16(B) are views illustrating a construction procedure (part 2), wherein FIG. 16(A) is a plan view and FIG. 16(B) is a front, view.

FIGS. 17(A), 17(B) are views illustrating a construction procedure (part 3), wherein FIG. 17(A) is a plan view and FIG. 17(B) is a front view.

FIGS. 18(A), 18(B) are views illustrating a construction procedure (part 4), wherein FIG. 18(A) is a plan view and FIG. 18(B) is a front view.

FIGS. 19(A), 19(B) are views illustrating a construction procedure (part 5), wherein FIG. 13(A) is a front view and FIG. 19(B) is a plan view of a precast cylindrical body 12 portion.

FIGS. 26(A), 26(B) are side views illustrating tilting of a tower by wind in an upwind type, wherein FIG. 26(A) shows a calm state (upright) and FIG. 26(E) shows a wind receiving state (tilted).

DETAILED DESCRIPTION OF THE INVENTION

Embodiments of the present invention will be described in detail with, reference to the accompanying drawings.

Figure 1:
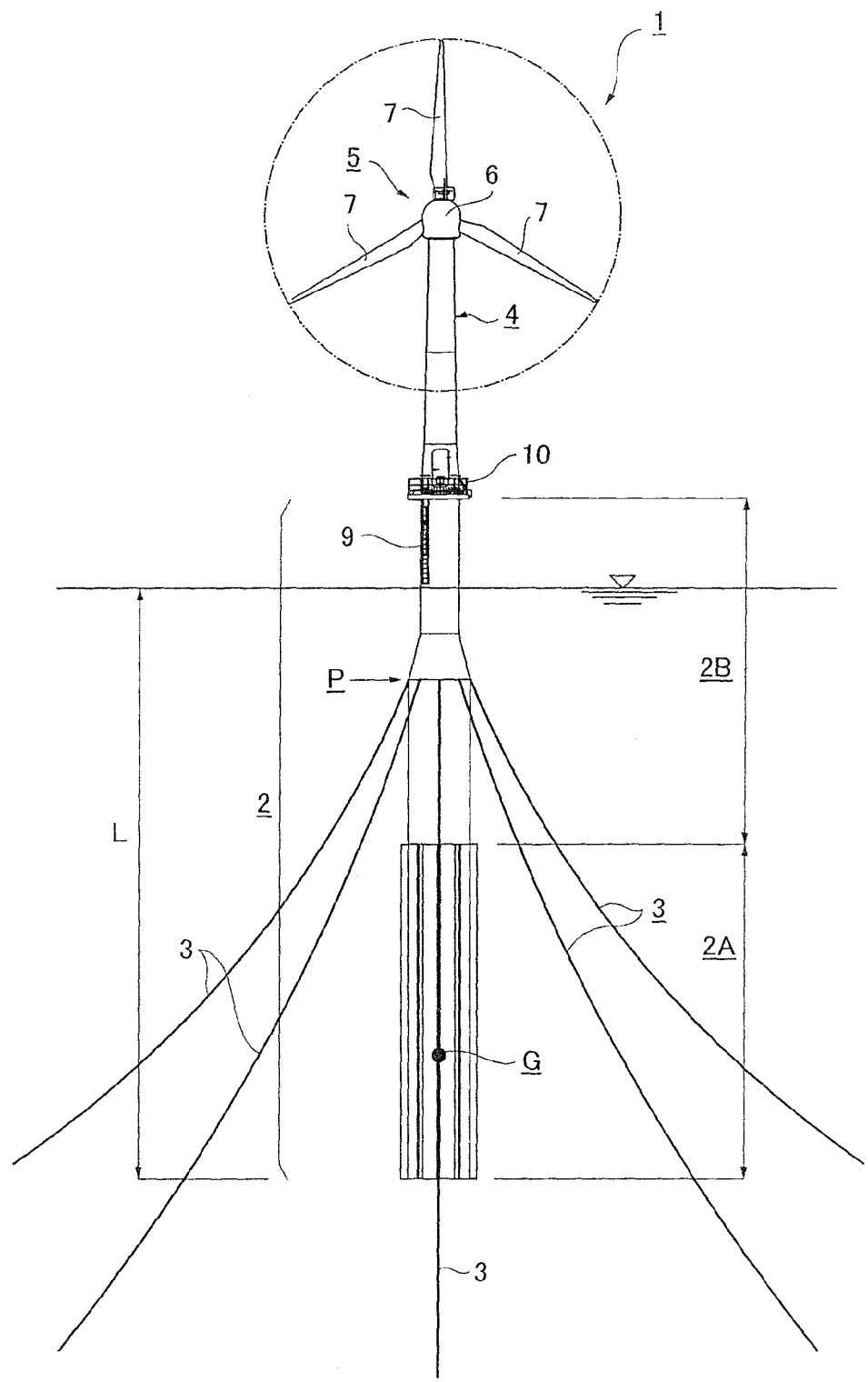
FIG. 1 is a side view of a floating offshore wind power generation facility 1 according to the present invention.

As illustrated in FIG. 1, an offshore wind power generation facility 1 according to the present invention includes a floating body 2, mooring cables 3, a tower 4, and a windmill 5 installed at the top of the tower 4, the windmill 5 including a nacelle 6 and a plurality of blades 7, 7, . . . .

Figure 2:
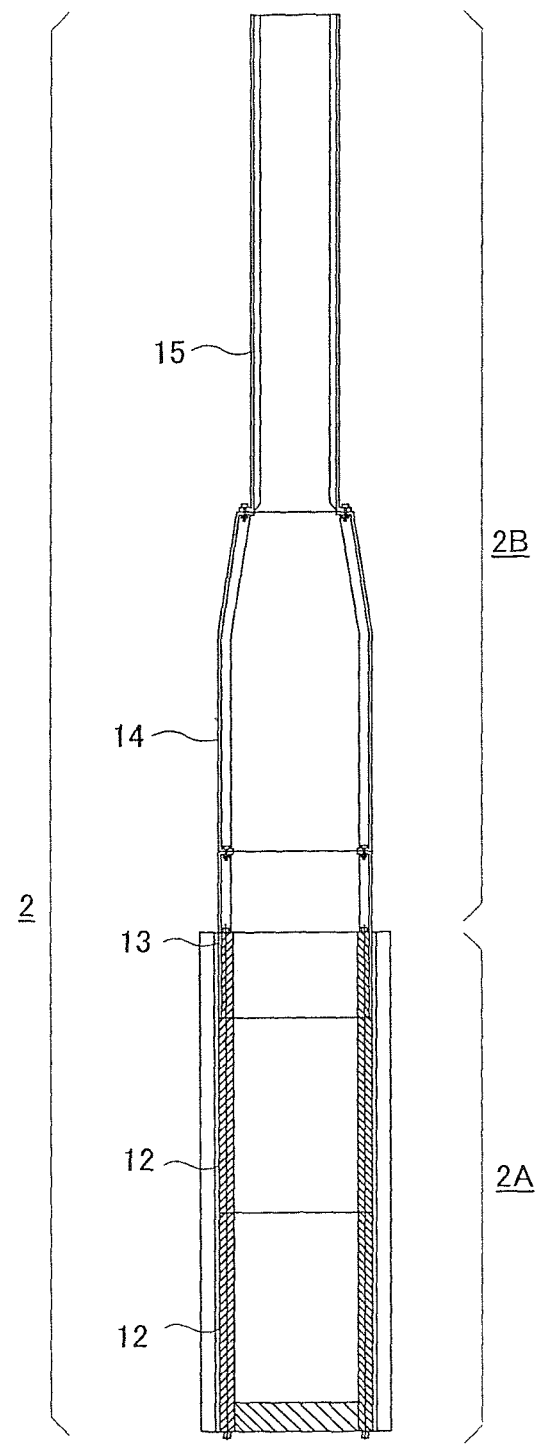
FIG. 2 is a longitudinal sectional view of a floating body 2.

As shown, in FIG. 2, the floating body 2 includes a lower concrete floating body structure 2A and an upper steel floating body structure 2B provided consecutively on the upper side of the lower concrete floating body structure 2A, the lower concrete floating body structure 2A including a plurality of concrete precast cylindrical bodies 12 and 13 stacked on top of each other in the direction of height, the concrete precast cylindrical bodies 12 and 13 having been, integrally connected to each other with a PC steel material 19. A draft L of the floating body 2 is set to approximately 60 m or more for 2-MW power generation facilities.

The offshore wind power generation facility 1 will be described in more detail.

Figure 3A:
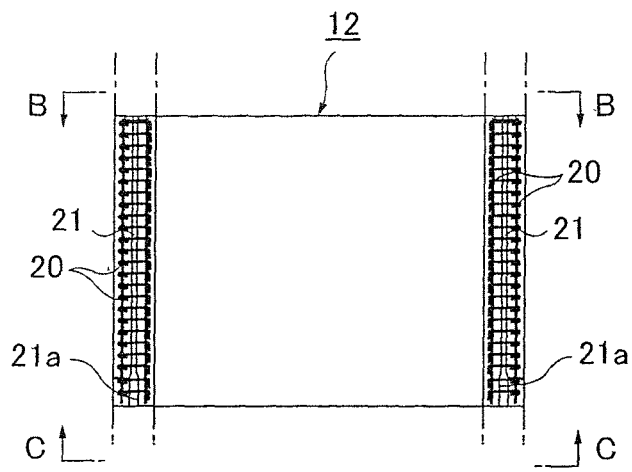
Figure 3B:
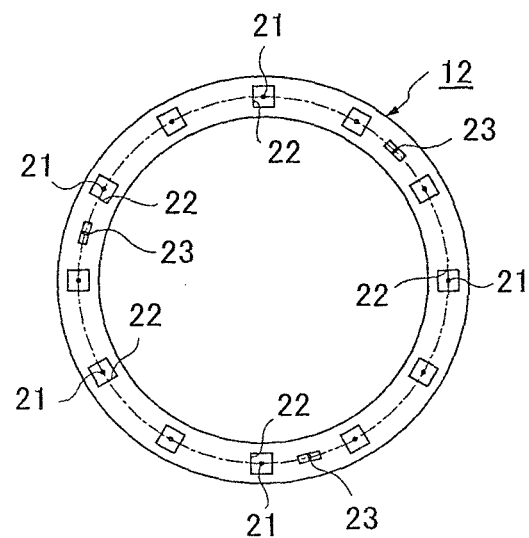
Figure 3C:
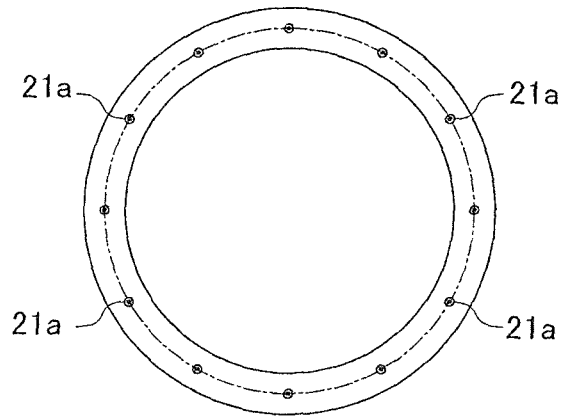

The lower concrete floating body structure 2A includes concrete precast cylindrical bodies 12, 12 . . . and a lower half portion of a composite precast member 13. As shown in FIG. 3, the precast cylindrical body 12 is a circular cylindrical precast member having an axially identical section. The precast cylindrical bodies may be those manufactured using an identical mold, or alternatively hollow precast members manufactured by centrifugal molding may be used.

In addition, to reinforcing bars 20, sheathes 21, 21 . . . for insertion of PC steel rods 19 are buried within a wall surface circumferentially at proper intervals. Sheath, diameter expansion portions 21a that can allow a coupler for coupling between the PC steel rods 19 to be inserted, are formed at the lower end of the sheathes 21, 21, . . . , and blockout portions 22 for fitting of anchor plates for anchoring are formed on the upper part. A plurality of lifting fittings 23 are provided at the top surface.

Figure 4A:
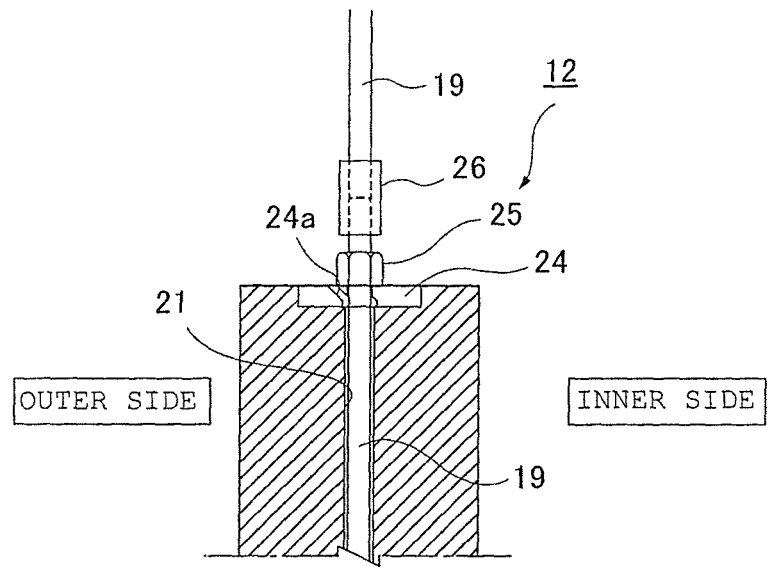
FIGS. 4(A), 4(B) are views illustrating connection between precast cylindrical, bodies 12 (13).

The precast cylindrical bodies 12 are connected to each other as follows. As shown in FIG. 4(A), precast cylindrical bodies 12, 12 are stacked on top of each other while inserting PC steel rods 19, 19 . . . extended upward from the lower precast cylindrical body 12 into sheathes 21, 21, . . . . An anchor plate 24 is then fitted in a blockout portion 22, and tensile force is introduced into the PC steel rod 19 by a nut member 25 for integration. A grout material is poured into the sheath 21 through a grout pouring hole 27. The hole 24a formed in the anchor plate 24 is a grout pouring confirming hole, and, when the grout material is delivered through the confirming hole, the filling of the grout material is terminated.

Figure 4B:
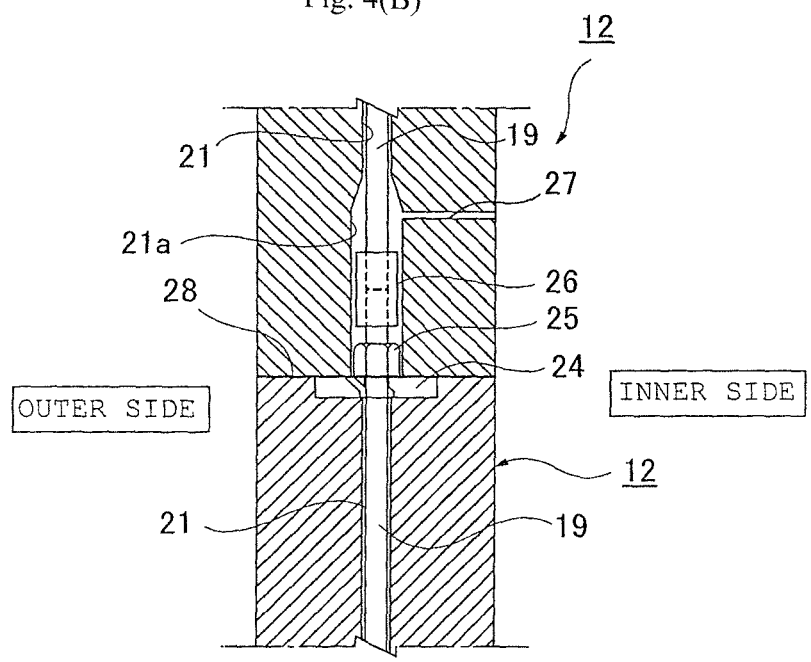

Next, as shown in FIG. 4(B), a coupler 26 is threadably mounted on a projection part of the PC steel rod 19. The PC steel rods 19, 19 . . . on the upper side are joined to each other, and the upper precast cylindrical body 12 is stacked while inserting the above PC steel rods 13, 19 . . . into the sheathes 21, 21, . . . of the precast cylindrical, body 12. The procedure of anchoring the PC steel rod 19 is successively repeated by the above method to stack the precast cylindrical bodies 12 in the direction of height. In this case, an epoxy resin-based or other adhesive 28 or a sealing agent is coated on a joining face between the lower precast cylindrical body 12 and the upper precast cylindrical body 12 to ensure water sealing and to join the mating faces.

Figure 5:
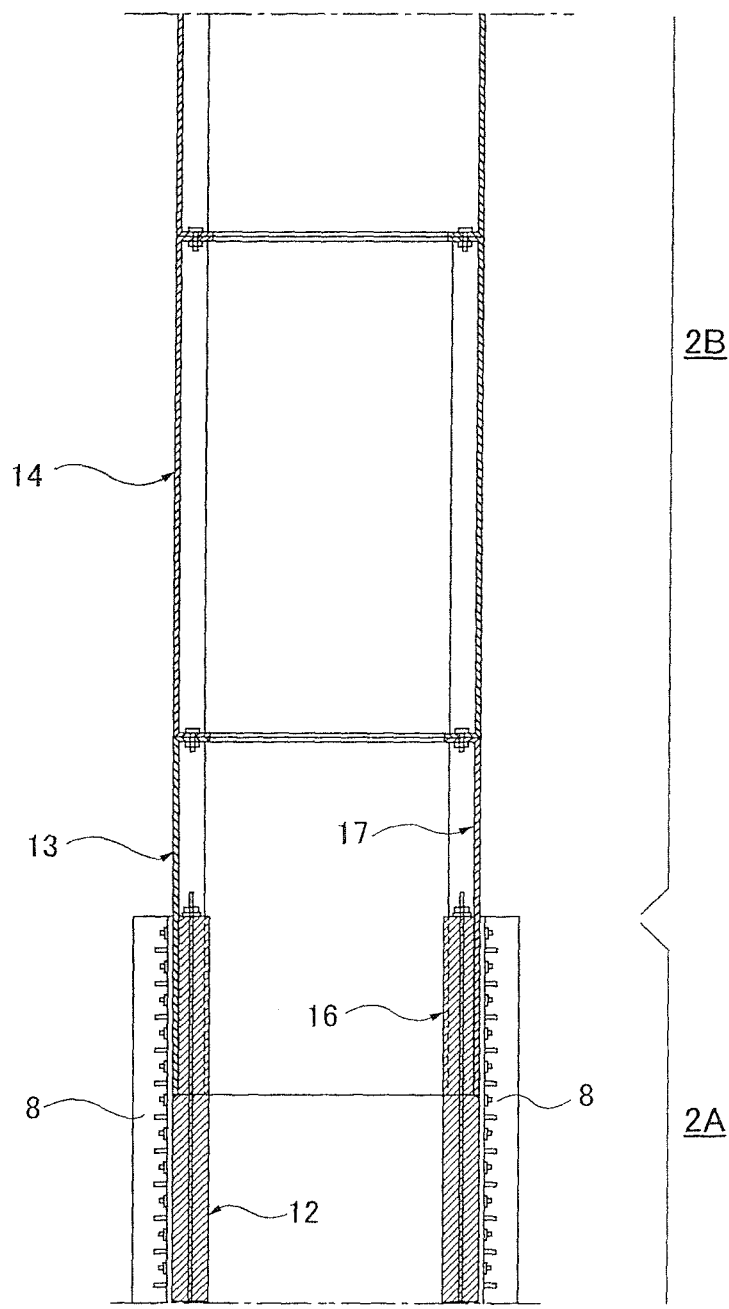
FIG. 5 is a longitudinal sectional view of a boundary between a lower concrete floating body structure 2A and an upper steel floating body structure 2B.

Next, as shown in FIG. 5, the composite precast member 13 has a composite structure composed of a concrete precast cylindrical body 16 and a steel cylindrical body 17. The concrete precast cylindrical body 16 and the steel cylindrical body 17 are integrally manufactured. The precast cylindrical body 16 has an outer diameter that is a value obtained by subtracting the wall thickness of the steel cylindrical body 17 from the outer diameter of the steel cylindrical body 17, and the lower half of the steel cylindrical body 17 is fitted to the outer circumference of the precast cylindrical body 16. The upper end face of the precast cylindrical body 15 serves as a fastening face for the PC steel rod 19.

The upper steel floating body structure 2B includes the upper half of the composite precast, member 13 and the steel cylindrical bodies 14, 15. The lower portion of the lower steel cylindrical body 14 has an outer diameter identical to the composite precast member 13 and is connected, to the composite precast, member 13, for example, by a bolt or welding (fastening with a bolt being shown in the drawing). The upper part of the steel cylindrical body 14 has a circular truncated cone shape having a gradually reduced diameter.

The upper steel cylindrical body 15 is a cylindrical body that has an outer diameter identical to the upper part outer diameter of the lower steel cylindrical body 14 and is continued from the upper part of the lower steel cylindrical body 14. The upper steel cylindrical body 15 is joined to the lower steel cylindrical body 14, for example, by a bolt or welding (fastening with a bolt being shown in the drawing).

On the other hand, the tower 4 is formed of a steel material, concrete or PRC (prestressed reinforced concrete) and is preferably formed of a steel material and has a small total weight. The outer diameter of the tower 4 is substantially identical to the outer diameter of the upper steel cylindrical body 15, and the outer shape is free from a difference in level and is vertically continued. In an example shown in the drawing, a ladder 3 is provided at the upper part of the upper steel cylindrical body 15, and a corridor anchorage 10 is circumferentially provided, at a substantial boundary between the tower 4 and the upper steel cylindrical body 15.

As shown in FIG. 1, a mooring point P of the mooring cable 3 to the floating body 2 is set to a position that is below the sea surface and above a gravity center G of the floating body 2. Accordingly, the contact of boats and ships with the mooring cable 3 can be prevented. Further, a resistance moment M with the gravity center G of the floating body 2 presumed to be central is produced at the mooring point P so as to prevent excessive tilting of the floating body 2, and thus, the tilted posture of the tower 4 can be properly kept.

On the other hand, the nacelle 6 is a device loaded with, for example, a generator that converts the rotation of the windmill 5 to electricity, or a controller that can automatically change the angle of the blade.

Figure 7A:
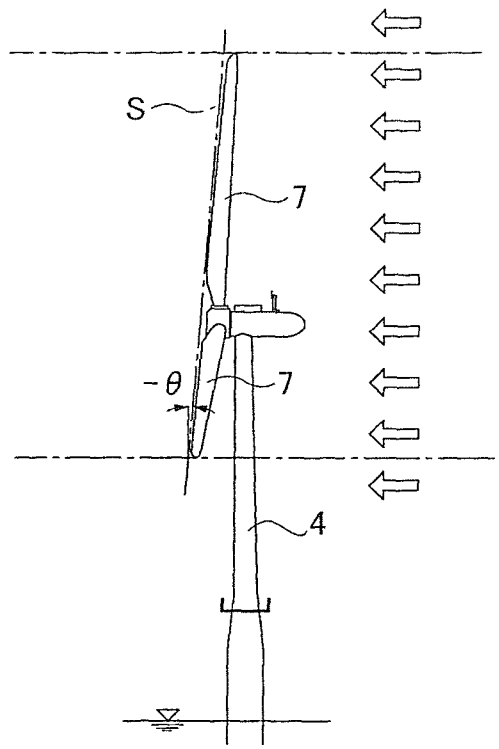
Figure 7B:
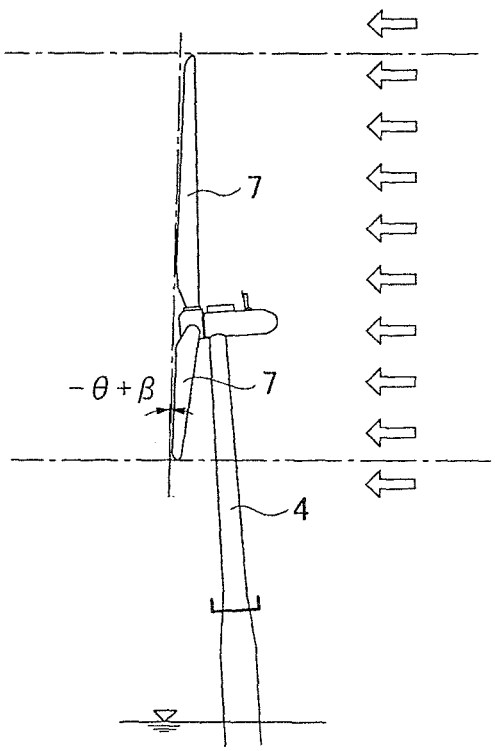

As shown, in FIG. 7(A), in the blades 7,7 . . . , the rotation axis has a predetermined upward angle θ to avoid contact with the tower 4. Accordingly, the blade rotational plane S is set so as to be tilted at an upward angle θ. As shown in the same drawing, in the present invention, the windmill type is a downwind type in which the blades 7,7 . . . are mounted on a leeward side of the nacelle 6 and the back side of the blades 7,7 . . . faces upwind. The upward angle 9 is approximately in the range of 5 to 10°. Thus, in a calm state, as shown in FIG. 7(A), the rotational plane S of the blade 7 is in a downward state (−θ) against upwind. On the other hand, when the blade 7 receives wind, as shown in FIG. 7(B); the blade 7 is tilted on the leeward, side and, consequently, the wind receiving area is increased, contributing to the prevention of a lowering in power generation efficiency.

Figure 9:
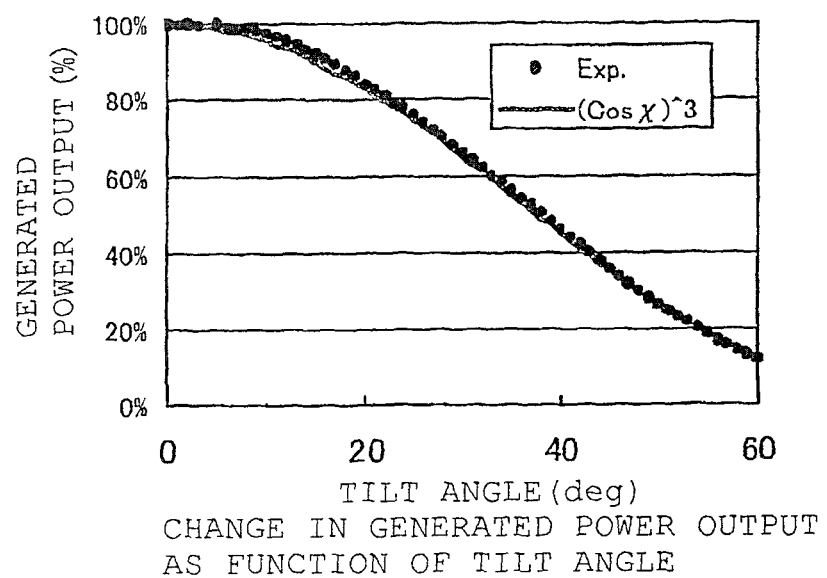
FIG. 9 is a view illustrating a change in generated power output as a function of a tilt angle of a tower 4.

According to existing literature (Proceedings of the Fourth Lecture Meeting "(5) Futai Shiki Yojo Furyoka Hatsuden No Kaihatu (Development of floating body-type offshore wind power generation)," National Maritime Research Institute), as shown in FIG. 9, it was demonstrated that, at an upward, angle of 10°, the power generation efficiency is lowered by about 5%. Accordingly, in such a state that the windmill 5 is rotated, when the tower 4 is tilted toward a leeward, side and the blade faces windward (where the blade rotational plane S is vertical), a 5% improvement in power generation efficiency can be expected.

Figure 8:
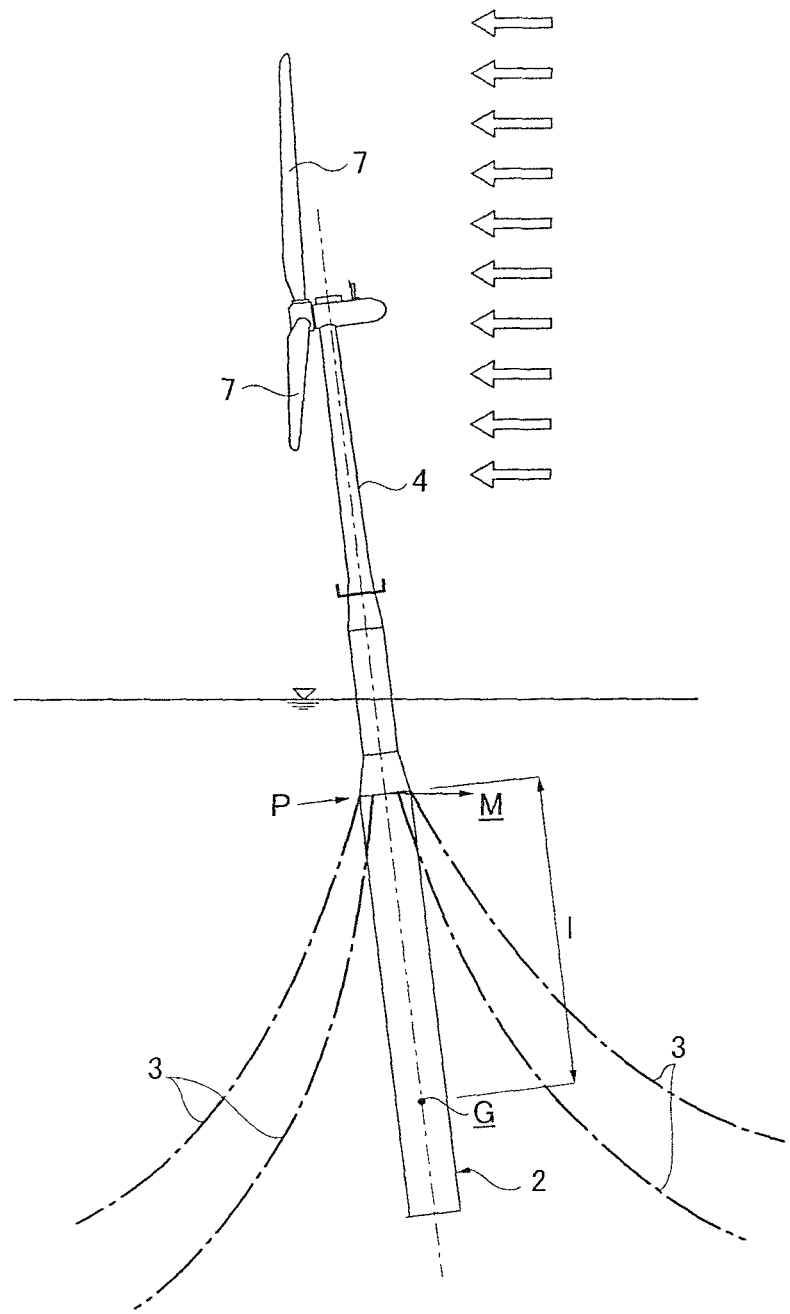
FIG. 8 is a whole side view illustrating a tilt controlled state by the production of moment of resistance.

On the other hand, in the present invention, as shown in FIG. 1, the mooring point P of the mooring cable 3 to the floating body 2 is set at a position that is below the sea surface and above the gravity center G of the floating body 2. Accordingly, as shown in FIG. 8, when the tower 4 is excessively tilted on the leeward, side by wind pressure, a resistance moment M with she gravity center G of the floating body 2 presumed to be central is produced at the mooring point P to suppress excessive tilting of the floating body 2, and, thus, the tilted posture of the tower 4 can be properly kept. The lower side of the floating body structure is a concrete floating body structure formed of a plurality of concrete precast cylindrical bodies stacked on top of each other in the direction of height, and the upper side of the floating body structure is a steel floating body structure formed of a steel member. By virtue of this construction, the gravity center G can be set at a position that is on a considerably downward side of the mooring point, and thus a large resistance moment M can be produced by an increased arm length l of the resistance moment M.

Ballast materials such as water, gravels, fine or coarse aggregates, or metallic particles are introduced into the hollow portion of the floating body 2. Preferably, the amount of the ballast material, introduced, is regulated so that, when wind acts at an average wind velocity, the rotational plane S of the blades 7 is a substantially vertical plane.

Figure 6:
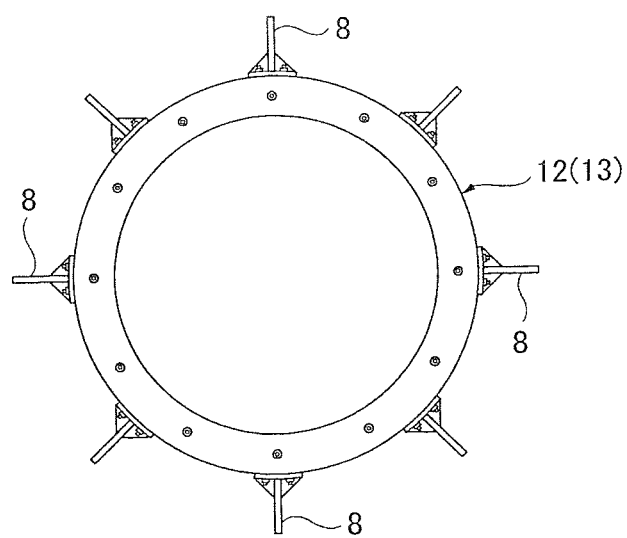
FIG. 6 a cross-sectional view of a lower concrete floating body structure 2A including yaw-suppressing fins 8.

On the other hand, in the present invention, as shown in FIG. 1, a plurality of yaw-suppressing fins 8,8 . . . protruding from a circumferential surface are provided on the lower side of the floating body 2 in a circumferential direction while providing spacing between the yaw-suppressing fins 8,8 . . . . Specifically, as shown in FIG. 6, yaw-suppressing fins 8,8 . . . that are radially protruding are provided on a circumferential surface of the precast cylindrical bodies 12, 13 in a circumferential direction at equal intervals (eight equally spaced intervals in an example illustrated in the drawing). In general, in a spar-type offshore wind power generation facility, fins are not provided because the fins increase the resistance of water. Since, however, fins are provided only on the lower side of the floating body 2, the yaw movement of the floating body 2 during a storm can be effectively prevented. Preferably, the yaw-suppressing fins 8, 8 . . . are installed at a position of 25 m or more, more preferably 30 m, in terms of water depth. Preferably, the protrusion length of the yaw-suppressing fins 8 is approximately 0.10 to 0.15 time, more preferably 0.11 to 0.13 time, the outer diameter on the lower side of the floating body 2.

Figure 10A:
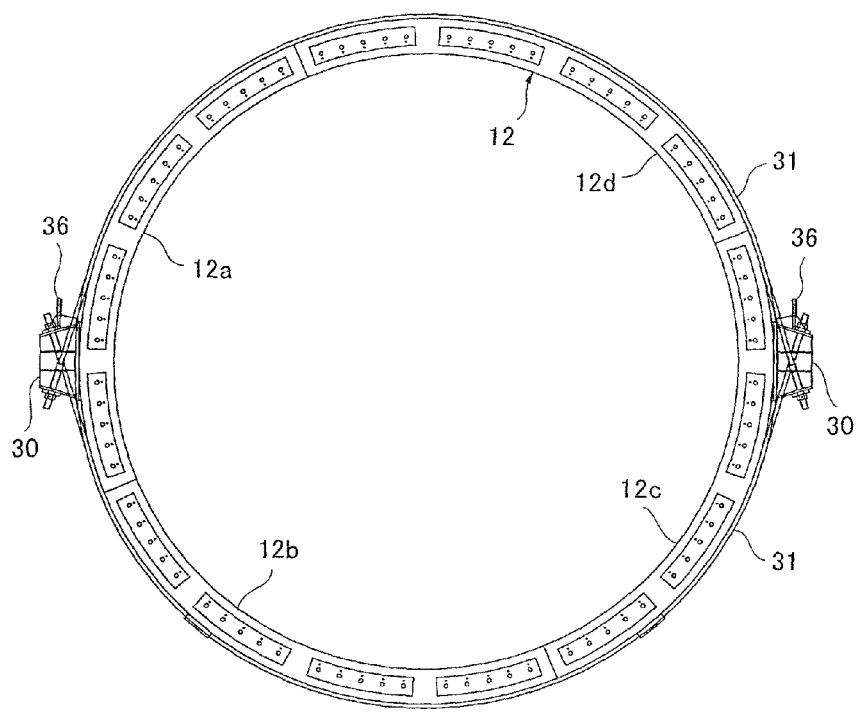
Figure 10B:
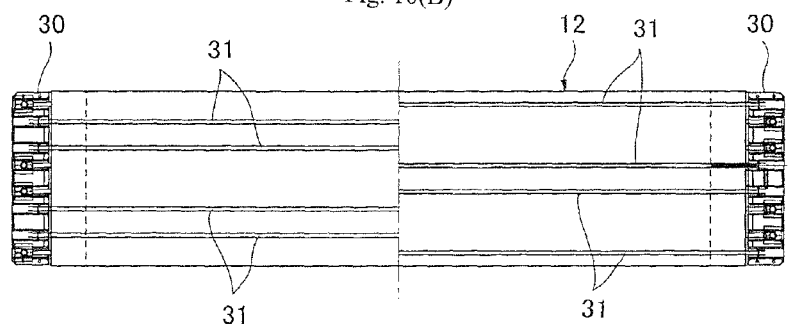
Figure 11A:
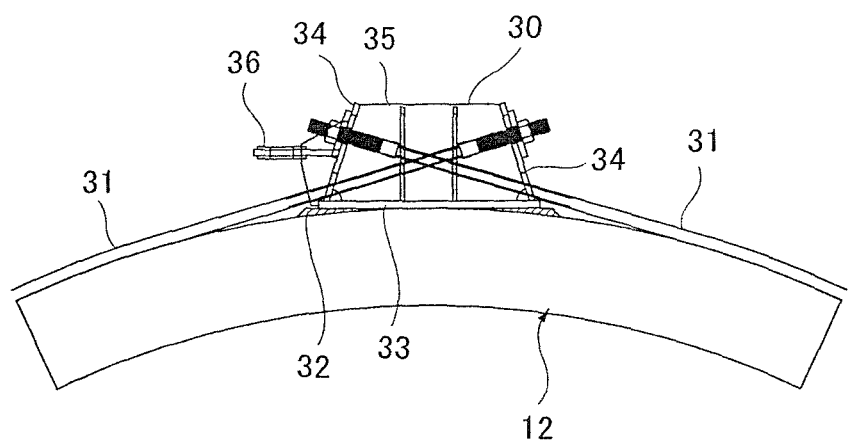
Figure 11B:
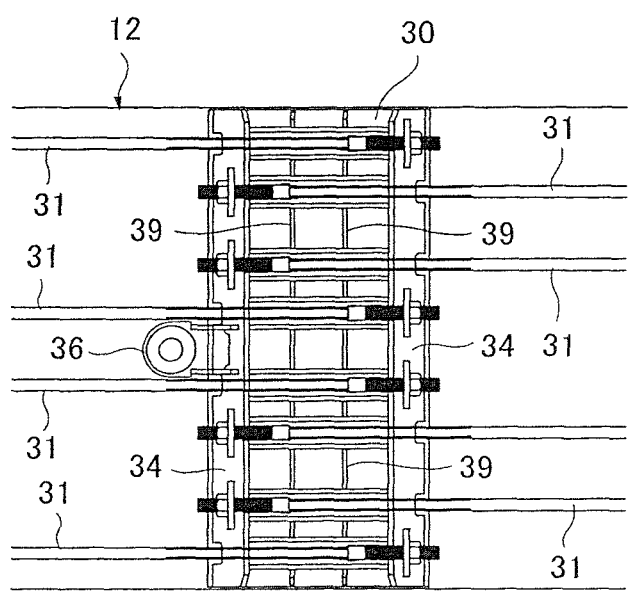

The lower concrete floating body structure 2A may be such that the precast cylindrical bodies 12 and 13 have been integrated with each other in a circumferential direction. Alternatively, in large-scale offshore wind power generation facilities, as shown in FIGS. 10 and 11, the lower concrete floating body structure 2A is formed of circumferentially joined split precast cylindrical bodies 12a to 12d corresponding to a plurality of circumferentially split precast cylindrical bodies 12 and 13. An outer cable 31 with a tensioning force introduced thereinto is circumferentially wound in the outer circumference of the precast cylindrical bodies 12 and 13 formed by joining the split precast cylindrical bodies 12a to 12d in a circumferential direction. The precast cylindrical body 12 is circumferentially split into two or more portions, for example, four portions in an example illustrated in FIG. 10.

The joint structure of the precast cylindrical bodies 12 and 13 may be a publicly known one. However, a joint structure of precast concrete members disclosed in JP2009-235850A is suitable. In the joint structure of the precast concrete members, embedded members for anchoring respectively joined, to reinforcing bars disposed in plural stages in the vertical direction are embedded in a joint end face of one precast concrete member. Pocket-shaped, notched grooves with an opening thereof facing the outside are formed, in the embedded member for anchoring. At the same time, notched grooves having the same shape as the above notched grooves are formed in a vertical direction of concrete. Thus, vertical grooves that are vertically continued, are formed. At the joint end face of the other precast concrete member, reinforcing bars are disposed vertically in plural stages so as to be protruded to the outside, and anchorage members fitted to the pocket-shaped notched, grooves are fixed to the tip end of the protruding reinforcing bars. Anchorage members of the reinforcing bars provided in a protruded form at the joint end face of the other precast concrete member are inserted along the vertical grooves of the one precast concrete member to join the precast concrete members to each other. In such a state that the anchorage members of the other precast concrete member are positioned in the pocket-shaped notched grooves of the embedded members for anchoring of the one precast concrete member, a grout material is filled into gaps. According to this joint structure, the necessity of welding work at the work site can be eliminated, and, at the same time, the necessary amount of grout used can be reduced. Thus, shortening of working hours and a reduced construction cost can be realized. Further, when the width of the joint portion is reduced, a good appearance can be realized.

In the outer cable 31, both ends are anchored by an anchorage device 30 that serves as a tensioning end in introducing the tensioning force. As shown in FIG. 11(A), the anchorage device 30 is installed in a pedestal concrete 32 provided in the outer circumference of the precast cylindrical body 12. As shown in FIG. 10(A), the anchorage device 30 is provided at two places that face each other in a diametrical direction of the precast cylindrical body 12. More specifically, as shown in FIG. 12, the anchorage device 30 is composed mainly of a base plate 33 installed on the pedestal concrete 32, side plates 34, 34 that are provided upright from both sides of the base plate 33 at a predetermined inward angle, and a plurality of bearing plates 35, 35 . . . provided upright between the side plates 34, 34 in a longitudinal direction at predetermined intervals. A lifting fitting 36 that lifts the precast cylindrical body 12 is provided in an outward, protruded state in one side plate 34.

As shown in FIGS. 12 and 13, in one side plate 34, holes 34a, 34a, . . . are provided at predetermined intervals in a longitudinal direction, for the insertion of a flat 43 fixed to the end of the outer cable 31 from the inside. An anchor plate 37 and a nut 38 are mounted in the flat 43 protruding from the hole 34a, and the nut 38 is fastened, so that a tensioning force with the side plate 34 serving as a tensioning end can be introduced. An opening 34b is provided in the other side plate 34 that faces the one side plate 34 to allow the outer cable 31 to be inserted into a standing proximal end.

In such a state that the outer cable 31 is inserted respectively into the hole 34a and the opening 34b provided in the side plates 34, 34, the bearing plate 35 is provided in a pair parallel to each other on both sides of the outer cable 31. Two support walls 39, 39 perpendicular to the bearing plates 35, 35 are provided upright between adjacent bearing prates 35, 35 corresponding to adjacent outer cables 31, 31.

The anchorage device 30 is preferably provided in two places that face each other in a diametrical direction of the precast cylindrical body 12, whereby one outer cable 31 provided in a tensioned state between the anchorage devices 30, 30 on both sides is provided, so as to fasten an approximately half circumference of the precast cylindrical body 12.

A lifting fitting 36 that lifts the precast cylindrical body 12 is provided in each of the anchorage devices 30, 30 on both sides. Accordingly, the necessity of separately assembling a stand for lifting can be eliminated, and the precast cylindrical body 12 can be lifted with a crane.

The outer cable 31 is provided so that, with respect to the anchorage device 30, an outer cable provided halfway around one side of the precast cylindrical body 12 and an outer cable provided halfway around the other side of the precast cylindrical body 12 are disposed substantially alternately. In the example shown in the drawing, as shown in FIG. 10(B), except for the outer cable 31 at both ends in the axial direction, an intermediate outer cable 31 is provided in a pair so that an outer cable provided, halfway around one side (left half portion) of the precast cylindrical body 12 and an outer cable provided halfway around the other side (right half portion) of the precast cylindrical body 12 are disposed substantially alternately. The number of outer cables 31 provided around one side is equal to the number of outer cables 31 provided around, the other side.

The outer cable 31 may be formed, of a PC steel rod or a PC steel strand. Preferably, however, as shown in FIG. 13, unbonded wires obtained by coating a grease 41 as a rust preventive/lubricating agent onto the outer circumference of a PC steel strand 40 and covering the processed PC steel strand 40 with, a synthetic resin 42 such as polyethylene are preferred. The use of the unbonded wire 31 as the outer cable 31 is advantageous in that, since the lubricity is high, the precast cylindrical body 12 can be evenly fastened and excellent rust preventive properties, constructability, and workability can be realized. A flat 43 for anchoring is fixed at both ends of the PC steel strand, and, at the same time, a stopper sheath 44 is fixed in the outer circumference of the base of the flat 43. The outer diameter of the stopper sheath 44 is formed larger than the inner diameter of the hole 34a provided in the side plate 34 to prevent excessive fastening by the outer-cable 31.

Figure 14:
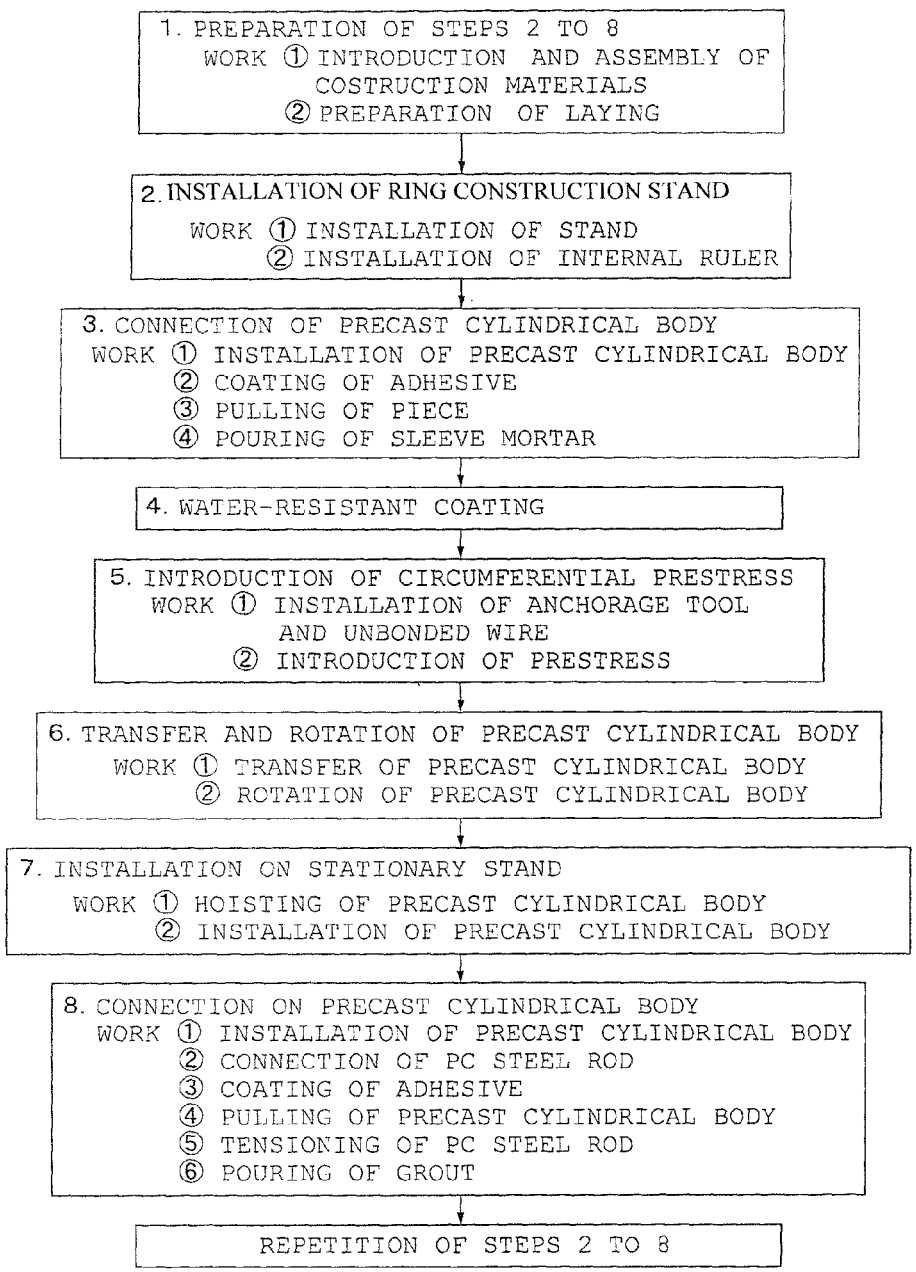
FIG. 14 is a flow diagram illustrating the procedure of construction of a floating offshore wind power generation facility 1.

Next, the procedure of assembling the lower concrete floating body structure 2A will be explained. As shown in FIG. 14, at the first step, the introduction and assembly of construction materials are carried out, and iron plates, H steels, and square bars are installed for preparation of laying.

Figure 15A:
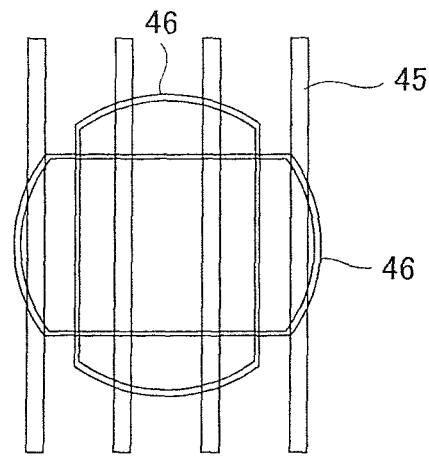
Figure 15B:

Next, at the second, step, as shown in FIG. 15, a ring construction stand 45 for the construction of a ring-shaped precast cylindrical body 12 by joining the split precast cylindrical bodies 12a to 12d in a circumferential direction is installed, and an internal ruler 46 that serves as a guide that, is abutted against the inner face of the precast cylindrical body 12 for finishing to a predetermined ring shape is installed on the ring construction stand 45.

Figure 16A:
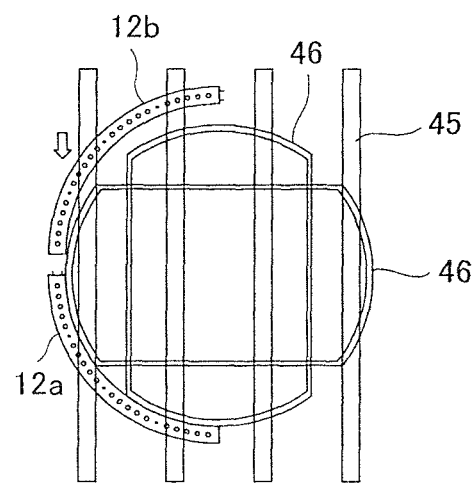
Figure 16B:
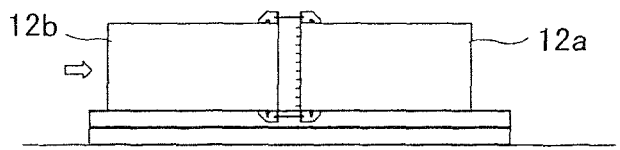

At the third step, as shown in FIG. 16, among the split precast cylindrical bodies 12a to 12d formed by splitting the precast cylindrical body into four parts, two split precast cylindrical bodies 12a, 12b are installed on the ring construction stand 45 in conformity to the internal ruler 46 to construct a half ring-shaped split precast cylindrical body. Specifically, an adhesive is coated on a joint end face of the split precast cylindrical body 12a, 12b. One of the split precast cylindrical bodies, i.e., the split precast cylindrical body 12a, is set in conformity to the internal ruler 46. The other split precast cylindrical body, i.e., the split precast cylindrical body 12b, is then pulled and set by a pulling tool such as a jack suspended between both joint end faces. On the following day, when the adhesive is deemed to be dried, a sleeve mortar is poured, followed by curing for two days.

Thereafter, as shown in FIG. 17, a half ring-shaped split precast cylindrical body that has been separately prepared in the same manner as described above is installed, in conformity to the internal ruler 46, on the ring construction stand 45 on which the above-manufactured half ring-shaped split precast cylindrical body has been set, and both the half ring-shaped split precast cylindrical bodies are joined to each other to construct a ring-shaped precast cylindrical body 12. The procedure of joining between these end faces is as described above.

At the fourth step, water-resistant coating is applied on an outer surface and an inner surface of the ring-shaped precast cylindrical body 12.

At the fifth step, as shown in FIG. 18, an anchorage device 30 and an outer cable 31 are installed. A nut 38 is fastened to introduce a prestress into the outer cable 31, and the precast cylindrical body 12 is fastened. Preferably, in installing the outer cable 31, guide members are previously provided at predetermined intervals between, the anchorage devices 30, 30, and the outer cable 31 is installed along the guide members.

Figure 19A:
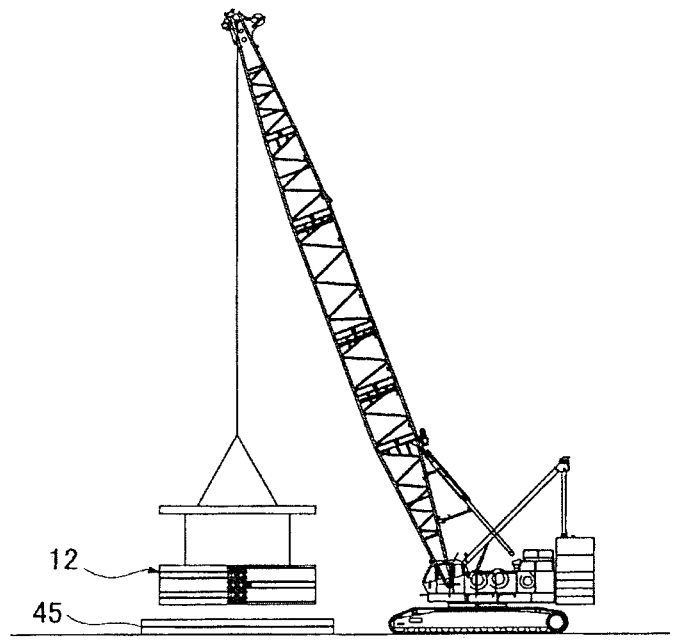
Figure 19B:
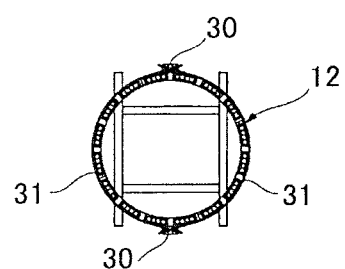
Figure 20:
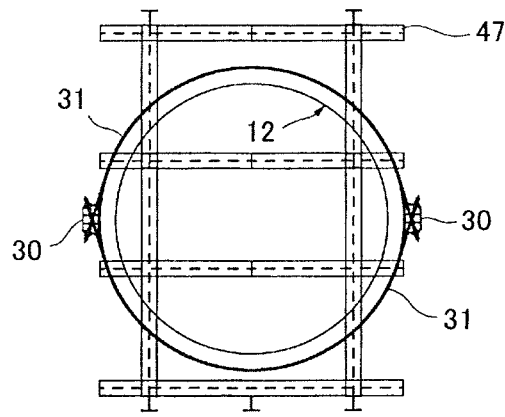
FIG. 20 is a plan view illustrating a construction procedure (part 6).
Figure 21:
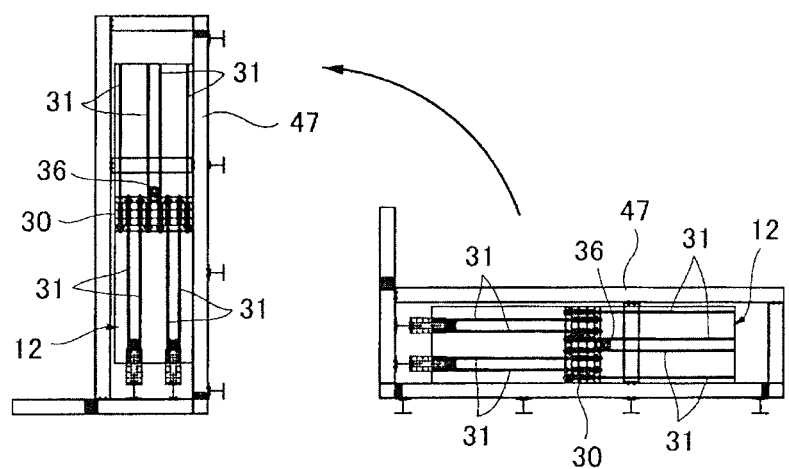
FIG. 21 is a front view illustrating a construction procedure (part 7).

At the sixth step, as shown, in FIG. 19, a precast cylindrical, body 12 that has been constructed sideways on a ring construction stand 45 is suspended with a crane, and, as shown in FIG. 20, is transferred sideways to a rotary stand 47. In the rotary stand 47, as shown in FIG. 21, one end of the stand is hoisted with a crane to erect the stand upright together with, the precast cylindrical body 12.

Figure 22:
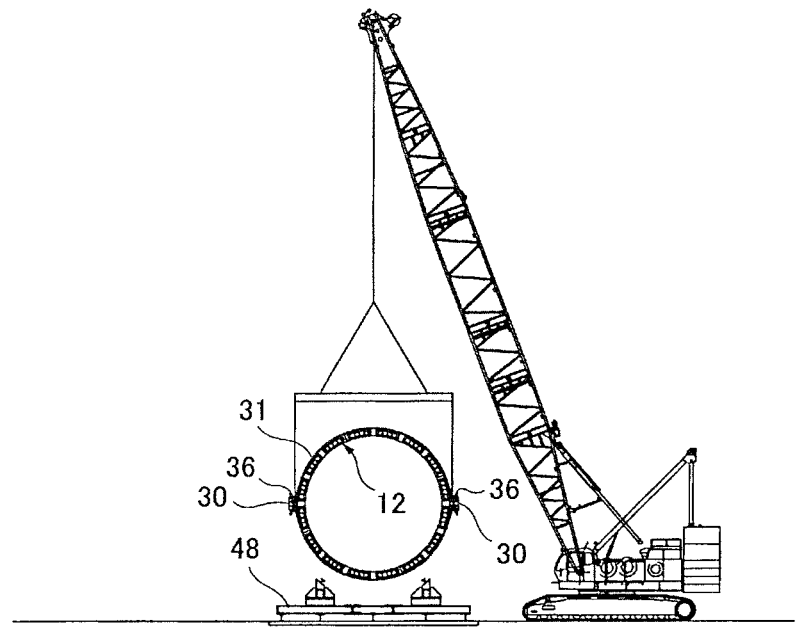
FIG. 22 is a front view illustrating a construction procedure (part 8).
Figure 23:
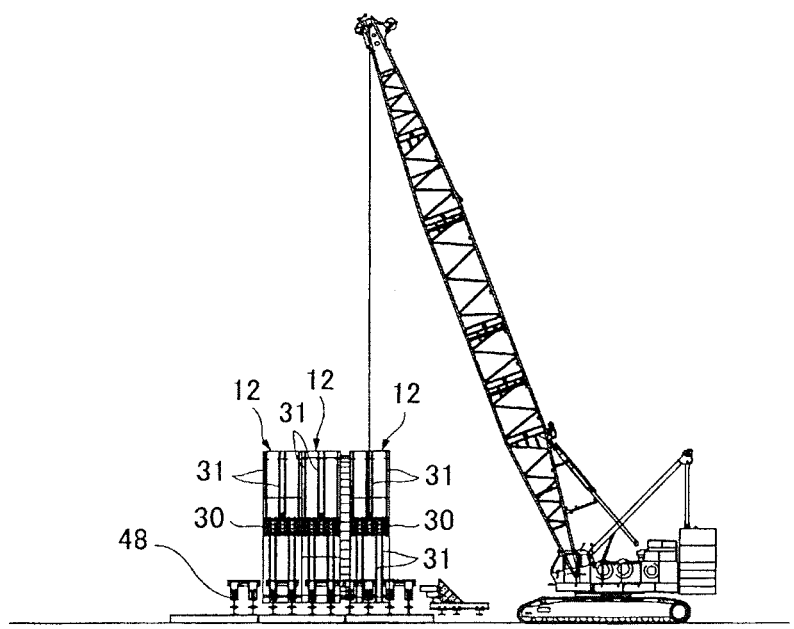
FIG. 23 is a front view illustrating a construction procedure (part 9).

At the seventh step, as shown in FIG. 22, fixing of the rotary stand 47 is removed. A tool is mounted on the lifting fitting 36 of the anchorage device 30, and the precast cylindrical body 12 is hoisted with the crane and, as shown in FIG. 23, is then installed on a stationary stand 48. In this case, the precast cylindrical body 12 is installed while providing spacing from previously installed and connected precast cylindrical bodies 12 by about 500 mm.

Figure 24:
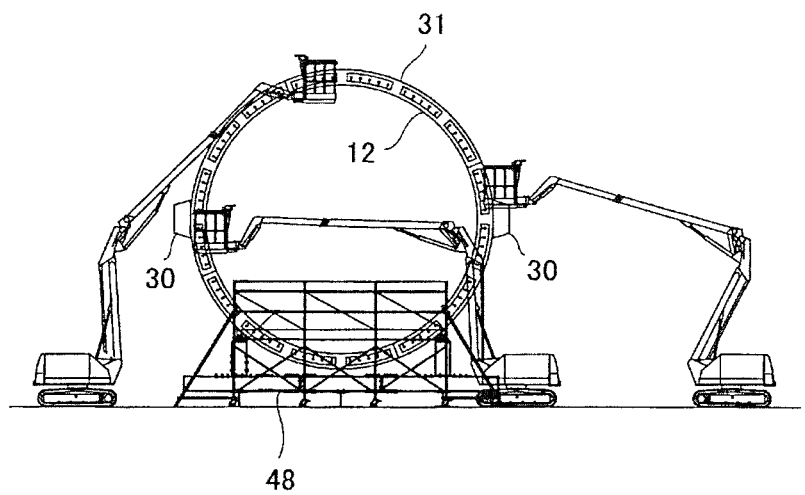
FIG. 24 is a front view illustrating a construction procedure (part 10).
Figure 25:
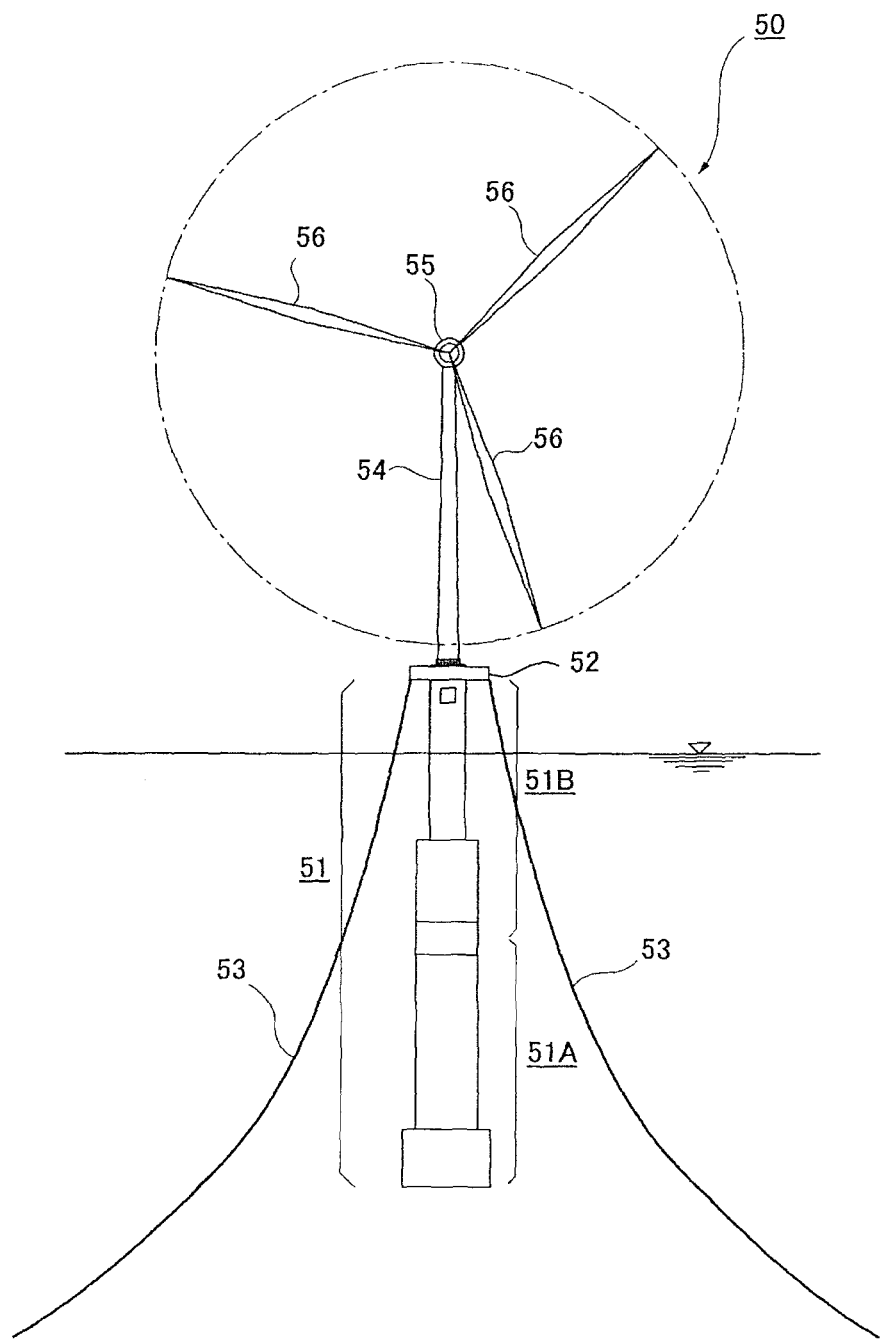
FIG. 25 is a general view of a conventional floating offshore wind power generation facility (JP2010-223113A).
Figure 26A:
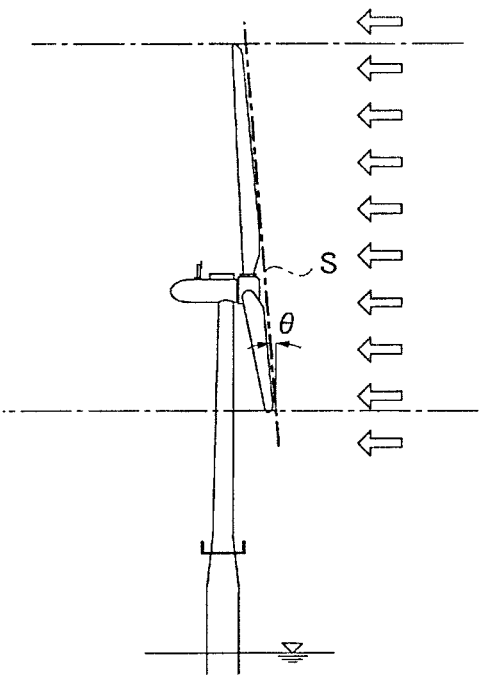
Figure 26B:
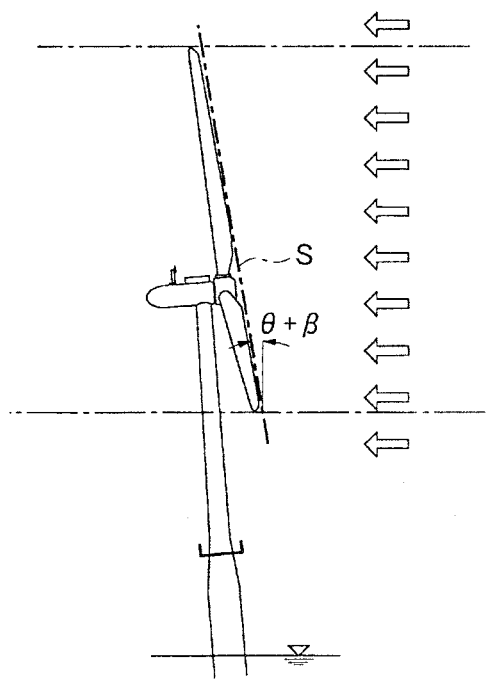

At the eighth step, an adhesive is applied, to an end face of a joint between an already installed and connected precast cylindrical body 12 and a precast cylindrical body 12 to be newly connected, and the cylindrical bodies are axially connected to each other as stated above. Specifically, as shown in FIG. 24, in such a state that the precast cylindrical body 12 is slightly hoisted with a crane, the precast cylindrical body 12 is pulled by a jack or the like, and, while inserting PC steel rods 19, 19 . . . into sheathes 21, 21 . . . , the precast cylindrical body 12 is connected. Thereafter, as described above and shown in FIG. 4, a tensile force is introduced into the PC steel rods 19, and a grout material is poured into the sheathes 21 for joining.

The second to eighth steps are repeated to complete a concrete floating body structure 2A.

In the floating offshore wind power generation facility 1 according to the present invention, even when the lower concrete floating body structure 2A is formed by joining split precast cylindrical bodies obtained by circumferentially splitting a precast cylindrical body 12, since an outer cable 31 with a tensioning force introduced thereinto is circumferentially wound, the precast cylindrical body 12 is fastened in a circumferential direction, contributing to an increased bending strength. As a result, even when a bending stress acts on the lower concrete floating body structure 2A, for example, in work for the connection of the precast cylindrical body 12 and work for erecting the floating offshore wind power generation facility 1, deformation and damage of the concrete floating body structure 2A can be prevented.

The outer cable 31 may be continuously installed even after the installation of the floating offshore wind power generation facility 1. Alternatively, since no significant bending stress acts after the installation of the floating offshore wind power generation facility 1, a method may be adopted in which the outer cable 31 is temporarily provided in assembling the floating offshore wind power generation facility 1 and can be removed after the installation of the floating offshore wind power generation facility 1.

The invention claimed is:

1. A floating offshore wind power generation facility comprising
a floating body, a mooring cable, a tower, and a windmill installed at a top of the tower, the windmill including a nacelle and a plurality of blades, wherein
the rotation axis of the windmill has a predetermined upward angle, and the windmill is a downwind windmill, in which the blades are attached to the leeward side of the nacelle and installed with the back surfaces of the blades facing windward,
the mooring cable is attached to the floating body at a mooring point below the surface of the sea and higher than the center of gravity of the floating body,
the floating body has a lower concrete floating body structure formed of concrete precast cylindrical bodies which are formed into cylindrical shapes having a same cross-sectional shape along planes which are perpendicular to an axial direction of the concrete floating body structure, and which are stacked in a direction of height, and each cylindrical body is connected along the height direction with a steel material, and wherein an upper steel floating body structure is provided on an upper part of the lower concrete floating body structure and wherein
each of the concrete precast cylindrical bodies is composed of a plurality of split cylindrical bodies joined to each other along a circumferential direction of the concrete precast cylindrical bodies,
each concrete precast cylindrical body comprises outer cables under tension wound around an outer circumference of the respective concrete precast cylindrical body, and
wherein the cables have first ends and second ends, and the first ends are anchored to a first anchoring device on the respective concrete precast cylindrical body and the second ends are anchored to a second anchoring device on the respective concrete precast cylindrical body, wherein the first and second anchoring devices face each other along a diametrical direction of the respective concrete precast cylindrical body, and wherein each outer cable is positioned around a first circumferential side or a second circumferential side of the respective concrete precast cylindrical body and wherein a number of outer cables positioned around the first circumferential side of the respective concrete precast cylindrical body are the same as a number of outer cables positioned around the second circumferential side of the respective concrete precast cylindrical body.

2. The floating offshore wind power generation facility according to claim 1, wherein a plurality of yaw-suppressing fins protruding from a circumferential surface of the floating body are provided on the lower portion of the floating body around the circumferential surface with spacing between adjacent yaw-suppressing fins.

3. The floating offshore wind power generation facility according to claim 1, further comprising ballasts having a weight that has been determined so that, when wind acts at an average wind velocity, the blades rotate in a rotational plane that is a substantially vertical plane.

4. The floating offshore wind power generation facility according to claim 1, wherein the outer cables are spaced from one another in an axial direction of the respective concrete precast cylindrical body.

5. The floating offshore wind power generation facility according to claim 1, wherein each of the anchorage devices includes a lifting fitting for lifting the concrete precast cylindrical body.

6. The floating offshore wind power generation facility according to claim 1, wherein the split precast cylindrical bodies are formed by splitting the precast cylindrical bodies in the circumferential direction.

7. A method of producing and installing a floating offshore wind power generating facility, comprising producing and installing the floating offshore wind power generating facility of claim 1, which comprises producing the concrete floating body structure of the facility of claim 1 by stacking and joining the plurality of individual concrete precast cylindrical bodies to each other to form an integral concrete precast cylindrical body, removably winding and fastening the outer cables around the outer circumference of the integral concrete precast cylindrical body, and, after final assembly of the concrete floating body structure with other components to produce the facility of claim 1 and installing the facility of claim 1, removing the outer cables from the integral concrete precast cylindrical body.

* * * * *